United States Patent
Celli et al.

(10) Patent No.: US 11,847,138 B2
(45) Date of Patent: Dec. 19, 2023

(54) REFLECTION DATABASE ARCHITECTURE WITH STATE DRIVEN SYNCHRONIZATION

(71) Applicant: Smart Systems Technology, Inc., Pittsburgh, PA (US)

(72) Inventors: Michelangelo Cherubini Celli, Greensburg, PA (US); David Thomas Hindman, Belchertown, MA (US)

(73) Assignee: Smart Systems Technology, Inc., Pittsburgh, PA (US)

(*) Notice: Subject to any disclaimer, the term of this patent is extended or adjusted under 35 U.S.C. 154(b) by 252 days.

(21) Appl. No.: 17/194,654

(22) Filed: Mar. 8, 2021

(65) Prior Publication Data
US 2022/0284040 A1 Sep. 8, 2022

(51) Int. Cl.
*G06F 16/27* (2019.01)
*G06F 16/21* (2019.01)

(52) U.S. Cl.
CPC .......... *G06F 16/273* (2019.01); *G06F 16/213* (2019.01); *G06F 16/278* (2019.01)

(58) Field of Classification Search
CPC ..... G06F 16/273; G06F 16/278; G06F 16/213
See application file for complete search history.

(56) References Cited

U.S. PATENT DOCUMENTS

| | | | |
|---|---|---|---|
| 9,330,271 B1 | 5/2016 | Shams et al. | |
| 2005/0289169 A1* | 12/2005 | Adya | G06F 11/1482 |
| 2006/0149707 A1 | 7/2006 | Mitchell et al. | |
| 2007/0233699 A1* | 10/2007 | Taniguchi | G06F 16/27 |
| 2011/0161289 A1* | 6/2011 | Pei | G06F 16/275 707/613 |
| 2014/0040197 A1* | 2/2014 | Wijayaratne | G06F 16/178 707/625 |
| 2015/0012476 A1* | 1/2015 | Seng | B29C 48/00 707/601 |
| 2020/0201526 A1 | 6/2020 | Kuchibhotla et al. | |
| 2020/0233721 A1 | 7/2020 | Mathur | |
| 2020/0409977 A1 | 12/2020 | Yang et al. | |

OTHER PUBLICATIONS

International Search Report dated Jun. 29, 2022 to Smart Systems Technology, Inc for PCT/US22/19095.

* cited by examiner

*Primary Examiner* — Mark E Hershley
*Assistant Examiner* — Dustin D Eyers
(74) *Attorney, Agent, or Firm* — Potomac Law Group, PLLC

(57) ABSTRACT

Embodiments include systems and method for performing state driven bi-directional synchronization in a reflection database architecture. A set of changes to a series of data fields can be received at a first database, the set of changes being part of a first process flow. The first database can be a reflection of a second database over a partition. State driven synchronization can be performed by a bi-directional synchronization engine for at least a portion of the series of data fields between the first database and the second database. The bi-directional synchronization engine can be configured to bi-directionally synchronize data between the first database and the second database based at least in part on detecting a boundary state at one or more of the first database and the second database.

17 Claims, 18 Drawing Sheets

REFLECTION DATABASE ARCHITECTURE WITH STATE DRIVEN SYNCHRONIZATION

FIELD

The embodiments of the present disclosure generally relate to a reflection database architecture with state driven synchronization.

BACKGROUND

The software industry has evolved different versions of system architectures over the years. From the classical architecture to the N-tier architecture, each of the different iterations aimed to enhance certain aspects of software systems. However, modern architectures continue to experience significant pain points related to data expansion, murky data, data quality, data security, process optimization, and many others. An architecture that fits modern software systems and can also improve one or more of these pain points would generate substantial value in the industry.

SUMMARY

The embodiments of the present disclosure are generally directed to systems and methods for state driven bi-directional synchronization of databases in a reflection architecture. A set of changes to a series of data fields can be received at a first database, the set of changes being part of a first process flow. The first database can be a reflection of a second database over a partition. State driven synchronization can be performed by a bi-directional synchronization engine for at least a portion of the series of data fields between the first database and the second database. The bi-directional synchronization engine can be configured to bi-directionally synchronize data between the first database and the second database based at least in part on detecting a boundary state at one or more of the first database and the second database. State driven synchronization can be triggered when the bi-directional synchronization engine detects that the set of changes to the series of data fields achieves a boundary state for the first process flow, and until the bi-directional synchronization engine detects that the set of changes to the series of data fields achieves the boundary state for the first process flow, an asymmetry can be maintained between the first database and the second database for the portion of the series of data fields.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
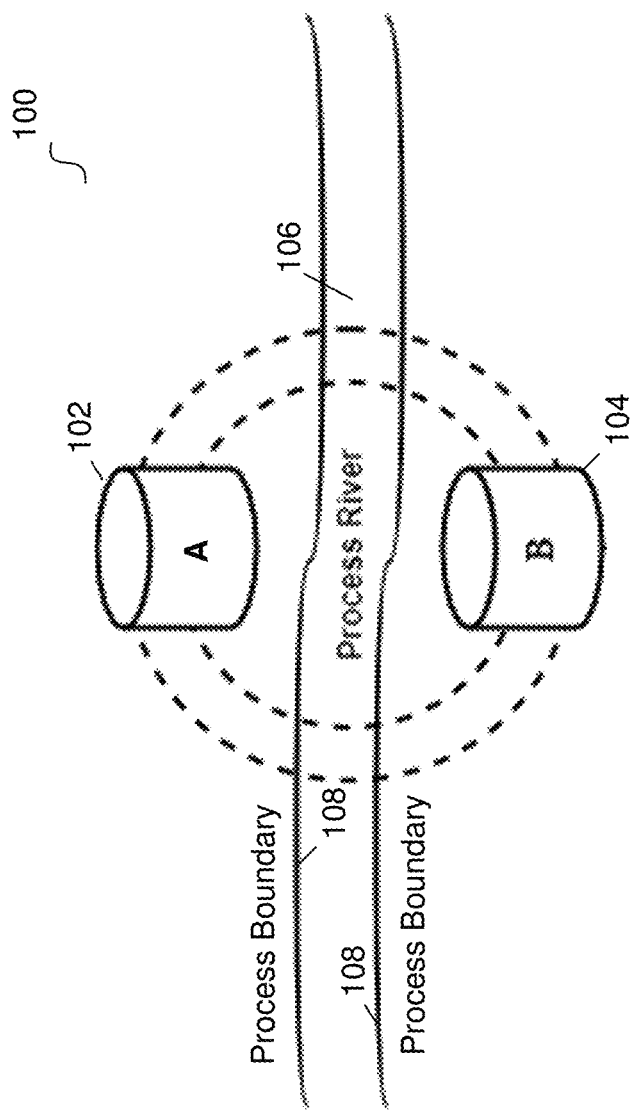
FIG. 1 illustrates a system for state driven bi-directional synchronization in a reflection database architecture according to an example embodiment.

Embodiments include a reflection database architecture that bi-directionally synchronizes data from two or more separate databases based on the state of the data contained in each database. For example, the reflection database architecture can include a source database and a reflection database. Over time, the state of data stored in each database can continuously change and state driven synchronization can be triggered for different portions of data at various points in time.

Embodiments of the reflection architecture achieve a database relationship where portions of data stored at each database are maintained in an asymmetric state until a synchronization is triggered. Because many different portions of data are continuously changing state at each database and synchronization is only triggered for portions of data at various points of time, at a given time the two databases can maintain a symmetric state for some portions of data and an asymmetric state for other portions of data. While a source and reflection database are used for descriptive purposes, the reflection database architecture can include two, three, four, or many more databases, and the databases can be configured as a source and many reflections, multiple sources and multiple reflections, databases with varying degrees of redundancy, or any other suitable configuration.

In some embodiments, the source database can store elements of data relevant to one or more organizational functions (e.g., accounting, business development, such as sales and marketing, audit, work assignments, human resources, and the like) or an entire organizational system, one or more applications (e.g., a web application, third-party application, and the like), one or more geographic locations, and any other suitable organizational schemes. Embodiments of the reflection database include a reflected copy of a portion of this data. For example, the reflection database can contain data for a particular organizational function (e.g., relevant to business development), data for a particular application (e.g., a particular third-party application) or set of applications, data for a specific geographic location, and the like. In some embodiments, the reflection database is a full copy of the source database.

As the source database serves its role (within a larger system), portions of the data stored in the source database can be read, edited, manipulated, and/or generally used to accomplish organizational tasks (e.g., accounting tasks, sales and marketing tasks, operational tasks, and the like). Within an organization, the way a data element is used can vary based on organizational process or can vary based on the state of a given organizational process (e.g., where in the organizational process the data element is being used). For example, a first organizational process may read a given data element, manipulate the data element at various points in time, and eventually overwrite the data element. A second organizational process may retrieve the data element and use one or more values in an analytical process or other batch process. However, the first and second organizational processes may have different temporal qualities such that the state of the given data element may be ripe for one of the processes but not for the other. In other words, the first and second organizational processes may interfere with one another when the given data element is forced to maintain a single state (e.g., in one database).

Embodiments of the reflection database architecture reflect the data element over a partition such that the given data element is maintained in two separate databases. The data element being maintained at two separate databases can achieve the requirements of both organizational processes, as the given data element need not maintain a single state. In some embodiments, the data element stored at the source database can be accessed and used in an analytical or batch process according to the second organizational process while the data element stored at the reflection database can be read, manipulated, and eventually overwritten according to the first organizational process.

In some embodiments, the temporal qualities between organizational processes may be based on dependencies among other data fields. For example, a first organizational process may access a number of data elements for display and/or analytical purposes, including a first data element. A second organizational process may overwrite the first data element, however the overwritten state of the first data element may not be ripe for the display or analytics of the first organizational process. For example, it may be required that the second organizational process achieve an outcome (e.g., inflection point and/or boundary state) by updating a set of data fields before the overwritten state of the first data element is ripe for the first organizational process. In other words, the display and/or analytics performed by the first organizational process would require use of the first data element in its original state (before being overwritten) until the completion of the second organizational process. Embodiments of the reflection architecture can maintain the first data element in different states and meet the data and temporal requirements of both organizational processes.

While two databases can maintain different states for the given data element at various points in time, often organizational demands require the data element to achieve a consistent state (even if temporarily). Embodiments perform state driven synchronization across the partition between the source database and target database for the given data element (e.g., when the organizational processes progress the data to a state that is ripe for the synchronization). In some embodiments, a bi-directional synchronization engine determines when a given organizational process (e.g., being performed using the reflection database) achieves a data state that is ripe for synchronization (e.g., with the source database) such that the data elements read, edited, and/or manipulated when performing the given organizational process can be synchronized. The synchronization engine can perform bi-directional synchronization such that data elements from the source database can be synchronized with the reflection database and data elements from the reflection database can be synchronized with the source database.

In some embodiments, a Process Abstraction Layer is implemented for a given organizational process that abstracts the given organizational process such that it can be realized in the database reflection architecture itself. For example, the Process Abstraction Layer can define inflection points and/or boundary states that, when detected by the bi-directional synchronization engine, trigger database synchronization. The Process Abstraction Layer can define contextualized data to be synchronized back and forth between the databases of the reflection architecture, and this contextualized data can be data that is necessary and sufficient to continue to progress the given organizational process to a desired outcome. In some embodiments, the Process Abstraction Layer and triggered synchronizations drive the given organizational process forward, utilizing the reflection database architecture and the process boundaries embedded in the architecture (by the Process Abstraction Layer) to propel the process.

Embodiments include multiple organizational processes (e.g., using both the source database and the reflection database) occurring at a given point in time, and thus the states of many organizational data elements can be in flux. Because these organizational processes result in many different data states, inflection points and/or boundary states are used to trigger synchronization of data elements across databases. Embodiments of the bi-directional synchronization engine determine when the data state achieved by performing the different organizational processes reach inflection points and/or boundary states such that the data elements read, edited, and/or manipulated can be synchronized. In other words, the bi-directional synchronization engine performs state driven synchronization of different data elements at different points in time, and this synchronization is triggered when the state of data elements relevant to a particular organizational process achieve an inflection point and/or boundary state.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for state driven bi-directional synchronization in a reflection database architecture according to an example embodiment. System 100 includes database 102, database 104, process river 106, and process boundaries 108. System 100 can selectively synchronize data elements between database 102 (e.g., a source database) and database 104 (e.g., a reflection database) based on the states of various data elements stored at each database. For example, the state of the data stored in each database is changed over time by various organizational processes, and these changes are represented by process river 106.

In some embodiments, database 102 and database 104 have similar or the same structure or architecture. In some embodiments, database 104 reflects only a portion of database 102, and thus the structure or architecture of database 104 is similar to or the same as the reflected portion of database 102. For example, database 102 can be a relational database with a number of relational data tables, and database 104 may reflect a portion of these relational data tables. In some embodiments, database 104 reflects only a subset of data fields (e.g., columns) from the portion of relational data tables. Database 104 may also include data tables or fields that are not present in database 102, such as data tables or fields that are relevant to a limited set of organizational processes that access, edit, and otherwise utilize database 104.

In some embodiments, process river 106 can represent changes caused by various organizational processes that alter or access (e.g., read, edit, and/or manipulate) the state of data elements stored at database 102 and database 104. In the context of an organization (e.g., business, government, or other entity comprising multiple people/groups of people), databases are often leveraged to drive organizational processes and achieve a desired outcome. For example, a business development organizational process may aim to grow a customer base while an accounting organizational process may aim to monitor and balance financial health. In modern organizations, both of these processes rely on databases to store relevant data and enable progress.

Process river 106 can be viewed as the progress of organizational processes to reach desired outcomes within the reflection database architecture. Embodiments integrate this flow of an organizational process towards a desired outcome by embedding process boundaries 108 of process river 106 into the reflection database architecture itself. For example, embodiments reflect (e.g., bi-directionally synchronize) contextualized data elements across a partition (separating database 102 and database 104) such that an organizational process can weave back and forth between databases 102 and 104. Embodiments of the Process Abstraction Layer can define and map process boundaries 108 and contextualized data for a given organizational process. This contextualized data can then be synchronized back and forth between databases 102 and 104 in a weave that propels the organizational process towards an outcome.

Conventional database architectures are limited in their process boundaries, and therefore lack the propulsion achieved by process river 106. In particular, conventional architectures have inflexible process boundaries that fail to integrate with the fluid requirements of organizational processes. Instead of propelling the organizational process forward, the process boundaries of conventional architectures often stall outcomes or achieve ineffective results. As opposed to conventional technology implementations that hinder the progress of organizational processes, the reflection architecture utilizes the databases and their connectivity to propel the organizational processes forward. For example, the connectivity of databases 102 and 104 is rooted in the sharing of contextualized data, which is data that is necessary and sufficient to move the organizational process forward. The Process Abstraction Layer abstracts the requirements of an organizational process such that they can be embedded directly into the reflection database architecture.

Returning to database 102 and database 104, in some embodiments of the reflection architecture the two databases can be used for different organizational processes. For example, a first organizational process may access or manipulate a series of data elements of first database 102 to progress the process while a second organizational process may access or manipulate a series of data elements of second database 104 to progress the process. In some embodiments, the top level organizational process and bottom level organizational process may be sub-parts of a parent organizational process, and the interactions between first database 102 and second database 104 may progress the parent organizational process to a desired outcome.

For example, the first organizational process may be a sales process to acquire and/or onboard a new customer or client. In some embodiments, data at database 102 may be collected and altered, for example until all required criteria to qualify a company record (e.g., new customer or client) is met, such as a client name, address, contact information, data relevant to a product or service for the client, client or customer type, data verification, and the like. In addition, the second organizational process may be a billing and collections process to collect fees or payment from a customer or client. In some embodiments, data at database 104 may be collected and altered, for example until all required criteria to satisfy an outstanding client or customer balance is met, such as collection attempts via various communication means (e.g., telephone, email, in-person, and the like), notes about each attempt, funds collected, and the like.

In some embodiments, progression through the first organizational process to collect the relevant data for onboarding a new customer or client (e.g., minimum data required to establish a new customer record) may update data at database 102, for example with a new customer record (e.g., a new row or rows of data in a customer data table). This new customer record can be reflected to database 104, for example by the bi-directional synchronization engine (e.g., once the engine detects that all required data for completing a new customer record is stored at database 102). For example, database 102 and 104 may both include the customer table, and the directional synchronization may involve one or more new rows being added to the customer table at database 104 to reflect the one or more new rows stored at database 102.

In some embodiments, progression through the second organizational process may be based on the customer record stored at database 104 that is reflected from database 102. For example, progression through the second organizational process to collect the relevant data to satisfy an outstanding client or customer balance (e.g., minimum data required to satisfy the balance) may involve accessing the customer record data. In some embodiments, the contact information (e.g., from the row/record of the customer data table) may be used to contact the customer or client in order to resolve the outstanding balance, and/or the customer type (e.g., from the row/record of the customer data table) may be used to configure the customer balance.

For example, a retainer of a first quantity may be required for a first customer type (e.g., based on an expected budget for the first customer type) and a retainer of a second quantity may be required for a second customer type (e.g., based on an expected budget for the second customer type). In other words, the data collected by progressing through the first organizational process and stored at database 102 can be reflected to database 104, and this same reflected data can be used to progress through the second organizational process to achieve an outcome (e.g., resolve an outstanding customer or client balance).

In some embodiments, it is the completion of the first organizational process, (or the arrival at an inflection point or boundary state), that triggers the synchronization and shifts from the first organizational process to the second organizational process. For example, once the new customer is onboarded, it may be time to collect the retainer for the new customer. However, database 102 is used to onboard the new customer and database 104 is used for billing and collections, and thus the bi-directional synchronization engine detects the completion of the first organizational process (e.g., the inflection point or boundary state) and reflects the new customer data from database 102 to database 104. Once this data is available in database 104, the billing and collections for the new customer (e.g., retainer) can be sought through the second organizational process.

In some embodiments, the asynchronous reflection between database 102 and database 104 is used to ensure the orderly completion of the first organizational process and second organizational process. For example, if the reflection were synchronous, database 104 may be used by the second organizational process to improperly seek a retainer from a customer at the wrong time, such as before the customer has been fully established. An example of an error that may occur is seeking the wrong retainer quantity from a customer using the customer's contact information because a customer type has not yet been properly established. The use of inflection point and/or boundary state to trigger synchronization and to shift from the first organizational process to the second organizational process ensures orderly completion and valid outcomes.

In the above example, the states for the customer data table at database 102 and database 104 may be asymmetrical for a period of time until the completion of the first organizational process and the triggering of synchronization. For example, a new customer data record (e.g., data row in the table) may be added to the customer data table at database 102, however this data record may not be present at database 104 until the data record at database 102 has a sufficient amount of data fields completed, at which time synchronization can be triggered.

In some embodiments, the asymmetrical state aids in the completion of the organizational processes. For example, the first organizational process may progress to collect relevant data and enter the data into database 102 without causing interference with the second organizational process. Similarly, the second organizational process can initiate and progress with sufficient and valid customer data because synchronization of the new customer data record and shifting to the second organizational process only occurs when the inflection point and/or boundary state is achieved. In other words, the asymmetrical state keeps both organizational processes organized until the time is reached for a shift from the first organizational process to the second organizational process. Then, the synchronization between database 102 and database 104 (e.g., resolving the asymmetrical state) at the inflection point and/or boundary state ensures an orderly shift from the first organizational process to the second organizational process.

Figure 2:
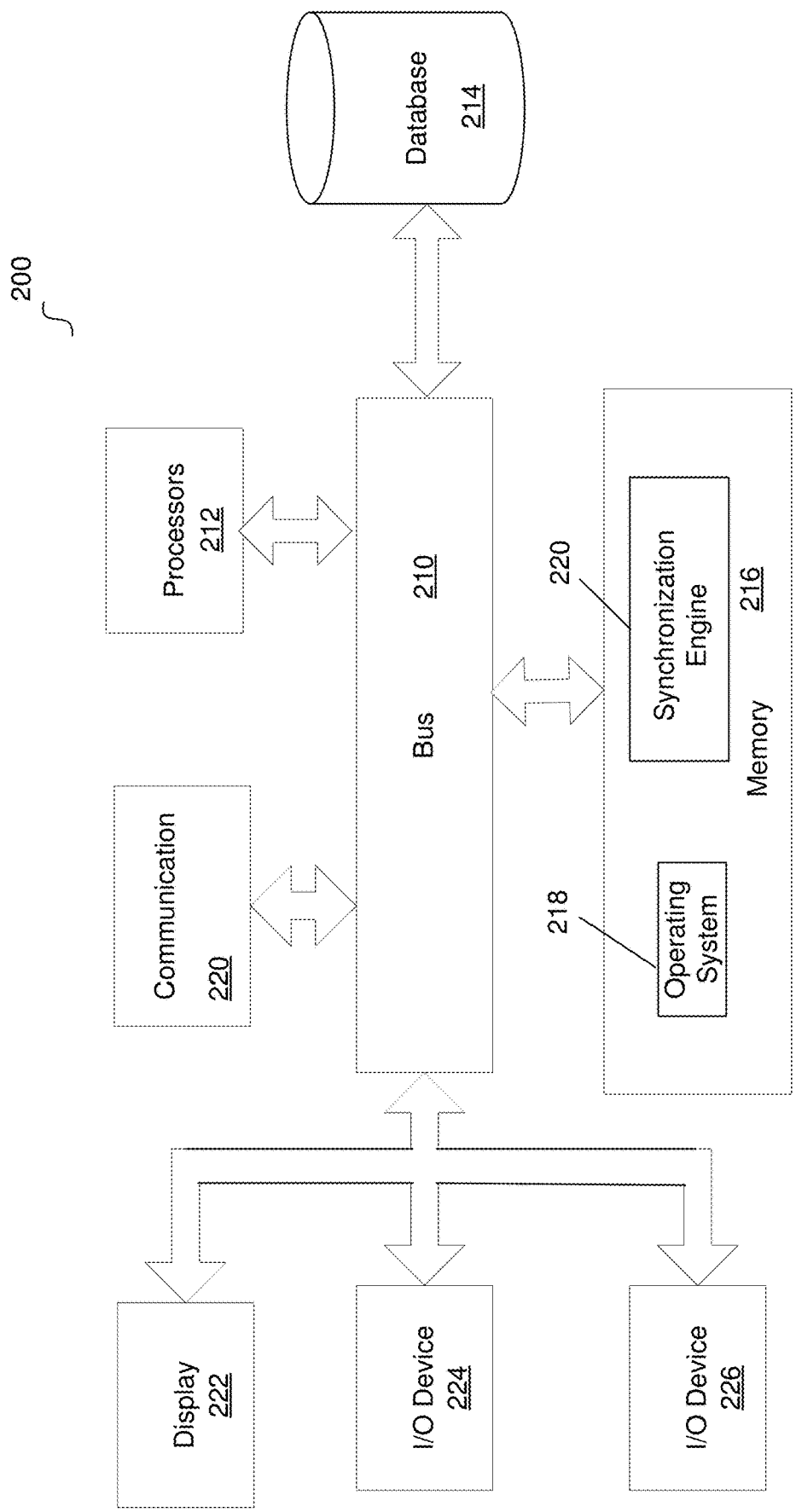
FIG. 2 illustrates a diagram of a computing system according to an example embodiment.

FIG. 2 is a diagram of a computing system 200 in accordance with embodiments. As shown in FIG. 2, system 200 may include a bus 210, as well as other elements, configured to communicate information among processor 212, data 214, memory 216, and/or other components of system 200. Processor 212 may include one or more general or specific purpose processors configured to execute commands, perform computation, and/or control functions of system 200. Processor 212 may include a single integrated circuit, such as a micro-processing device, or may include multiple integrated circuit devices and/or circuit boards working in combination. Processor 212 may execute software, such as operating system 218, synchronization engine 220, and/or other applications stored at memory 216.

Communication component 220 may enable connectivity between the components of system 200 and other devices, such as by processing (e.g., encoding) data to be sent from one or more components of system 200 to another device over a network (not shown) and processing (e.g., decoding) data received from another system over the network for one or more components of system 200. For example, communication component 220 may include a network interface card that is configured to provide wireless network communications. Any suitable wireless communication protocols or techniques may be implemented by communication component 220, such as Wi-Fi, Bluetooth®, Zigbee, radio, infrared, and/or cellular communication technologies and protocols. In some embodiments, communication component 220 may provide wired network connections, techniques, and protocols, such as an Ethernet.

System 200 includes memory 216, which can store information and instructions for processor 212. Embodiments of memory 216 contain components for retrieving, reading, writing, modifying, and storing data. Memory 216 may store software that performs functions when executed by processor 212. For example, operating system 218 (and processor 212) can provide operating system functionality for system 200. Synchronization engine 220 (and processor 212) can provide synchronization of a source database and a reflection database based on data flows. Embodiments of synchronization engine 220 may be implemented as an in-memory configuration. Software modules of memory 216 can include operating system 218, synchronization engine 220, as well as other applications modules (not depicted).

Memory 216 includes non-transitory computer-readable media accessible by the components of system 200. For example, memory 216 may include any combination of random access memory ("RAM"), dynamic RAM ("DRAM"), static RAM ("SRAM"), read only memory ("ROM"), flash memory, cache memory, and/or any other types of non-transitory computer-readable medium. A database 214 is communicatively connected to other components of system 200 (such as via bus 212) to provide storage for the components of system 200. Embodiments of database 214 can store data in an integrated collection of logically-related records or files.

Database 214 can be a data warehouse, a distributed database, a cloud database, a secure database, an analytical database, a production database, a non-production database, an end-user database, a remote database, an in-memory database, a real-time database, a relational database, an object-oriented database, a hierarchical database, a multi-dimensional database, a Hadoop Distributed File System ("HFDS"), a NoSQL database, or any other database known in the art. Components of system 200 are further coupled (e.g., via bus 210) to: display 222 such that processor 212 can display information, data, and any other suitable display to a user, I/O device 224, such as a keyboard, and I/O device 226 such as a computer mouse or any other suitable I/O device.

In some embodiments, system 200 can be an element of a system architecture, distributed system, or other suitable system. For example, system 200 can include one or more additional functional modules, which may include the various modules of Salesforce Customer Relationship Management ("CRM") systems, Zoho CRM systems, HubSpot CRM systems, Airtable CRM systems, MySQL database, PostgreSQL database, DynamoDB database, Redis database, Zapier Extraction, Transformation, and Load ("ETL") tools, Integromat ETL tools, Dataloader.io ETL tools, any other suitable cloud based components of CRM systems, cloud based databases, or cloud based ETL tools, or any other suitable modules.

Embodiments of system 200 can remotely provide the relevant functionality for a separate device. In some embodiments, one or more components of system 200 may not be implemented. For example, system 200 may be a tablet, smartphone, or other wireless device that includes a display, one or more processors, and memory, but that does not include one or more other components of system 200 shown in FIG. 2. In some embodiments, implementations of system 200 can include additional components not shown in FIG. 2. While FIG. 2 depicts system 200 as a single system, the functionality of system 200 may be implemented at different locations, as a distributed system, within a cloud infrastructure, or in any other suitable manner. In some embodiments, memory 216, processor 212, and/or database 214 are be distributed (across multiple devices or computers that represent system 200). In one embodiment, system 200 may be part of a computing device (e.g., smartphone, tablet, computer, and the like).

Figure 3A:
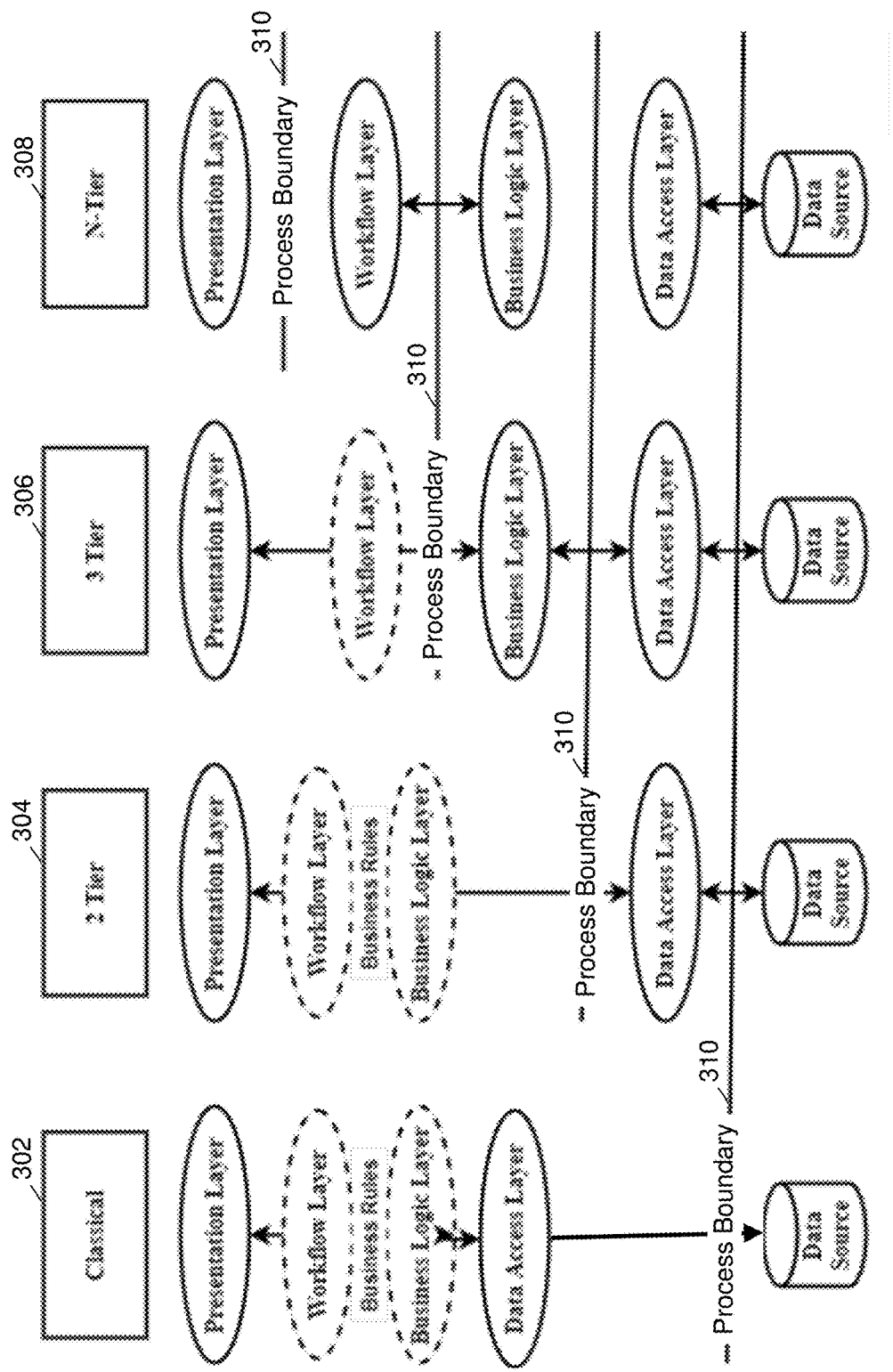
FIG. 3A illustrates conventional iterations of data architectures.
Figure 3B:
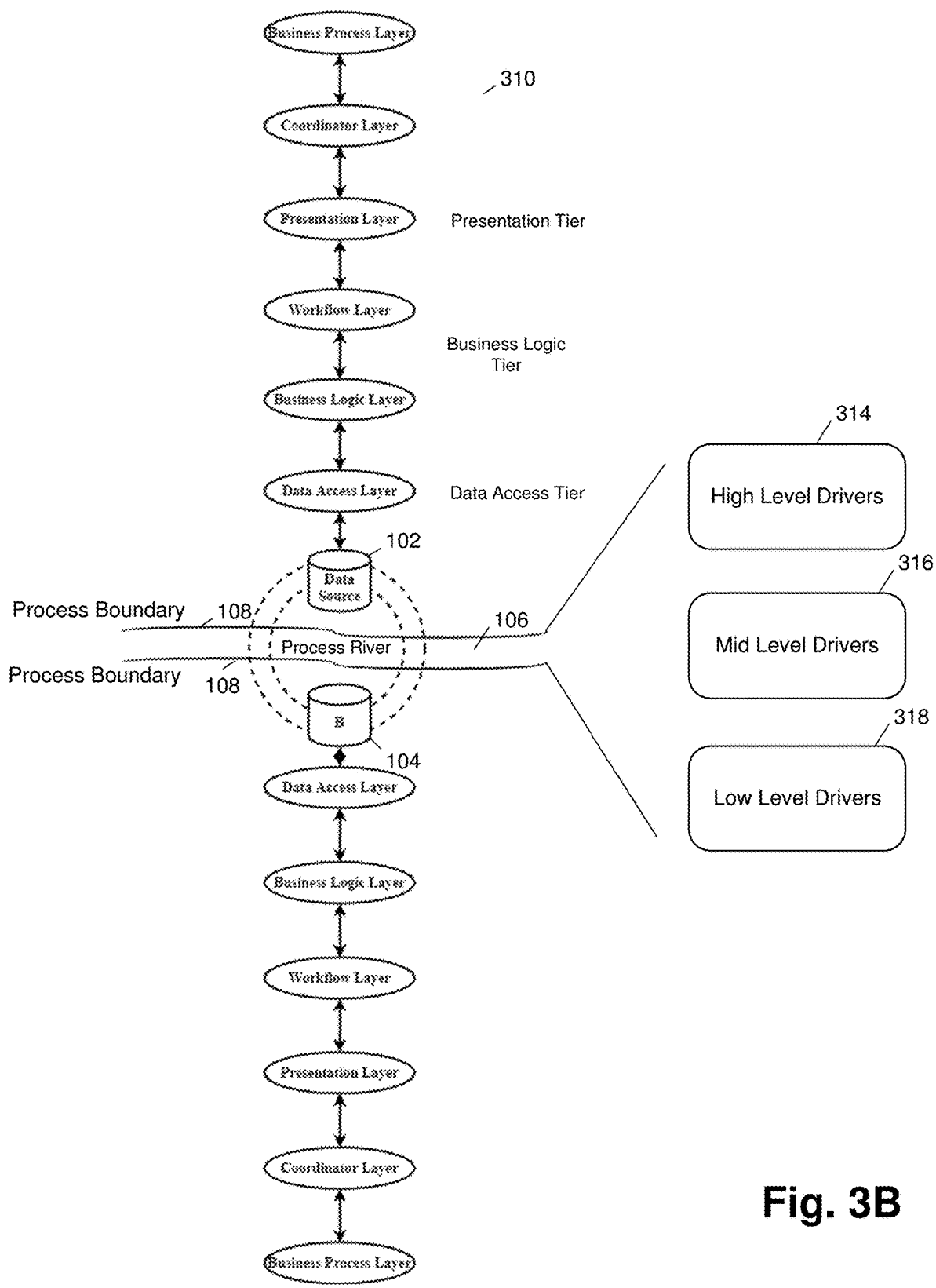
FIG. 3B illustrates a reflection database architecture according to an example embodiment.

FIG. 3A illustrates conventional iterations of data architecture and FIG. 3B illustrates a reflection database architecture according to an example embodiment. Architecture 302 depicts a classical architecture where the presentation layer, workflow layer, business logic layer, and data access layer are separated from the data source by a boundary. Software that follows the classical architecture can suffer from several drawbacks related to its monolithic construction. For example, monolithic structures can be difficult to scale, difficult to reuse, difficult to maintain and update, and generally cause organization and resource challenges over time. As a result, the software industry developed architectures 304, 306, and 308, or the 2-tier, 3-tier, and N-tier architectures. Because of the boundary separations between layers in these architectures, these architectures include several benefits over the classical architecture. For example, independence and thus reusability, enhanced scalability, improved maintenance, and generally improved organization.

However, all of architectures 302, 304, 306, and 308 still experience significant challenges in modern systems. In particular, data expansion continues to overrun storage resources and further creates murky data that is difficult to analyze and actionize. In addition, these architecture are designed to store data such that applications can access and edit the stored data, but the functionality (or desired outcomes of the software) is still separate from the design of the architecture itself. Because of this, points of friction continue to arise in these architectures that stall desired outcomes and ultimately cost valuable resources. Further, these architectures do not have a mechanism for continued process optimization. Without such a mechanism, each of architectures 302, 304, 306, and 308 is operating on borrowed time until a process moves in a manner that renders the system inoperable for reaching a desired outcome.

Architecture 310 of FIG. 3B depicts the reflection database architecture according to some embodiments. As discussed with reference to FIG. 1, database 104 can be the reflection of database 102 across a partition. Process river 106 can represent changes caused by various organizational processes that alter or access (e.g., read, edit, and/or manipulate) the state of data elements stored at database 102 and database 104 to reach desired outcomes using the software architecture. Embodiments implement a state driven bi-directional synchronization engine that selectively synchronizes contextualized data across the partition directionally from database 102 to database 104 and from database 104 to database 102. This state driven synchronization is triggered by the detection of an inflection point or boundary state at either of database 102 and/or database 104. The contextualized connectivity of databases 102 and 104 achieved by these synchronizations results in a weave pushed back and forth by process boundaries 108 such that the architecture continues to propel process river 106 forward towards desired outcomes.

Embodiments of the reflection database architecture implement a Process Abstraction Layer ("PAL") that runs through the reflection database architecture itself. As opposed to modern computer architectures, operating systems ("OS"), and programming languages, which have not evolved to accommodate a fundamental shift in computers and their use, the reflection database architecture considers the temporal qualities of data and its state at the design level. Referring back to FIG. 1, process river 106 can be viewed as the progress of organizational processes to reach desired outcomes. The Process Abstraction Layer of the reflection architecture propels the process river it supports by contextualizing data and specifying the system process components, their boundaries, and their arrangement in relationship to the reflection database architecture to achieve more productivity with fewer technical limitations.

In some embodiments, once the functional areas of the organizational processes to be supported by the reflection database architecture are defined and contextualized, coordinated data fields can be mapped for the Process Abstraction Layer. For example, these mapped data fields can be used to control contextual data quality that supports organizational process phases (both inter and intra process) without losing the integral relationship to the output goals of the holistic operating system.

The Process Abstraction Layer can include high level drivers 314, mid level drivers 316, and low level drivers 318, in order to abstract an organizational process such that it can be realized in embodiments of the reflection database architecture. This is similar to the way software drivers are used to abstract hardware interactions in a traditional operating system. For example, and similar to the way the different levels of driver permit high level software to communicate with low level software to control hardware, the different levels of driver for the Process Abstraction layer permit different levels of control over the organizational process that is being progressed.

In some embodiments, the high level drivers 314, mid level drivers 316, and low level drivers 318 of the Process Abstraction Layer achieve efficient levels of resource allocation for a work force. Embodiments of the reflection database architecture are implemented with coordinator interfaces, such as those discussed with reference to FIGS. 5, 6A, 6B, 7A, 7B, 7C, 7D, and 7E. Embodiments of the coordinator interfaces can be used as drivers that abstract the manner that a worker can progress an organizational process. A workforce is often made up of workers with different levels of relevant training, expertise, and potential impact, and thus the use of coordinator interfaces can distribute an organizational process across a workforce to optimize for effectiveness and efficiency.

Embodiments achieve a number of architectural advantages over conventional software architecture implementations. In particular, embodiments of the reflection architecture and dual-database structure provide increased flexibility and fluid options for attaching, storing, and mobilizing data in connection with the supported organizational processes both within and across the database technical and functional areas. Unique to the reflection architecture is that the process boundary is built into the architecture itself, which generates a support structure that is more fluent and achieves improved alignment with the requirements of organizational processes than traditional database architecture paradigms. While boundaries are established more or less conventionally within the individually limited component database structures in the conventional approaches (e.g., architectures 302, 304, 306, and 308), when databases across a partition are connected to encapsulate and emulate the full reflection database architecture in relationship to a Process Abstraction Layer, the global improvements to the productivity of the overall system throughput processed in number, quality, cost, and speed all improve. In particular, embodiments of the reflection database architecture realize improvements in data expansion, data quality, database security, and generally improve the fit between progression of organizational processes to reach desired outcomes and architectural design.

Figure 4:
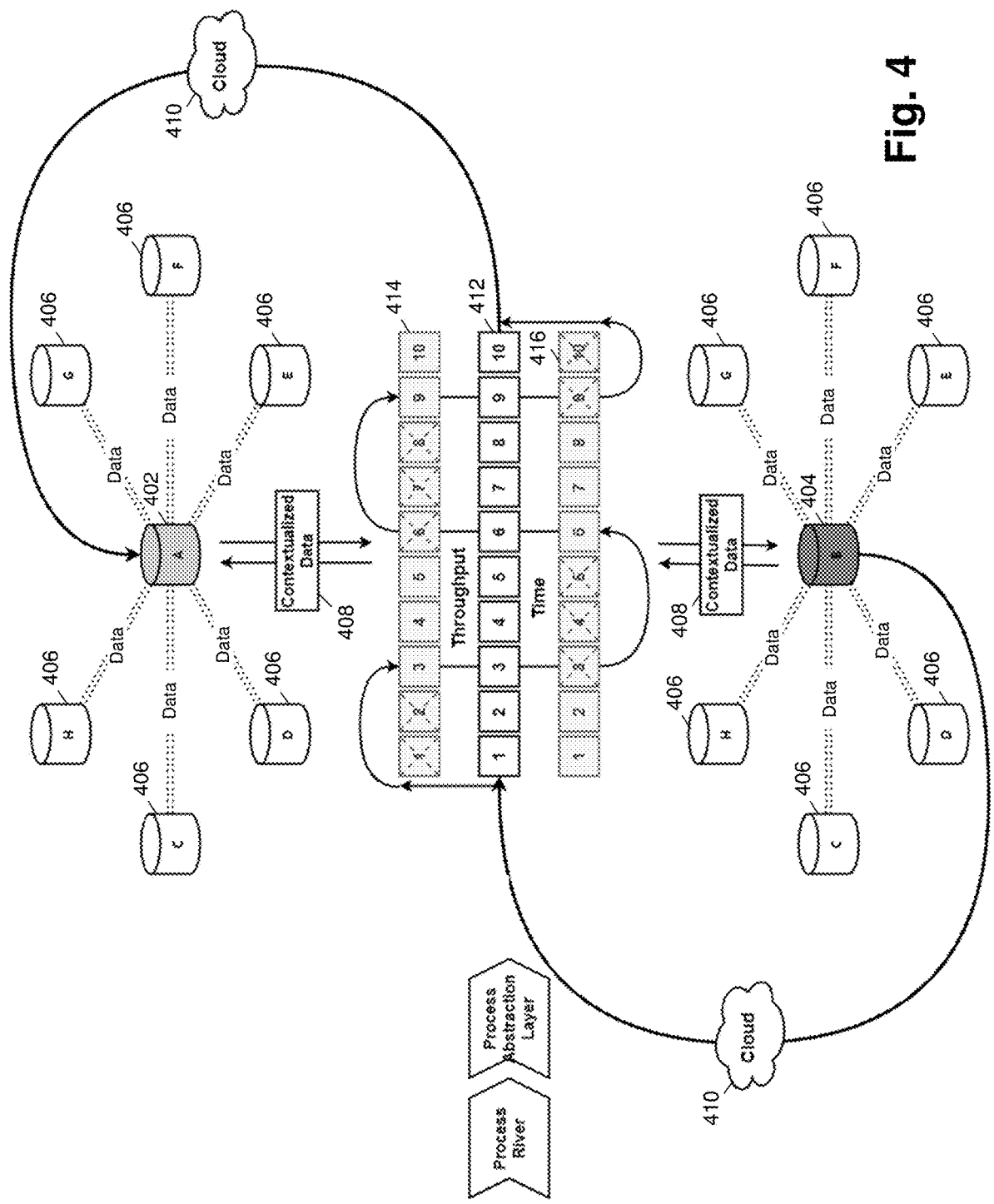
FIG. 4 illustrates a reflection database architecture that progresses organizational processes according to an example embodiment.

FIG. 4 illustrates a reflection database architecture that progresses organizational processes according to an example embodiment. FIG. 4 depicts database 402, database 404, functional databases 406 (e.g., Accounting, Advertising, Inventory, Enterprise Resource Planning ("ERP"), Email, Project Management, and the like), contextual data 408, cloud 410, organizational process 412, sub-organizational process 414, and sub-organizational process 416. In some embodiments, database 402 and database 404 are part of a reflection database architecture, where contextualized data 408 is shared between the databases. For example, contextualized data 408 can be shared by a bi-directional synchronization engine that performs state driven synchronization of the databases based on the state of stored data reaching an inflection point and/or boundary state (e.g., state that triggers synchronization).

Functional databases 406 can be one or more function specific databases that store data relevant to these specific functions. For example, one of database 406 can be an ERP database, a second can be a project management database, a third can be an email database, and the like. Database 402 and database 404 can be communicatively connected to database(s) 406, as depicted. In some embodiments, database 402 and/or database 404 connect to a limited set of database(s) 406, only one of database(s) 406, or none of them.

Embodiments of the reflection database architecture illustrated in FIG. 4 progress organizational process 412 using database 402, database 404, and the bi-directionally synchronized contextualized data 408 achieved by the reflections between these databases. Sub-organizational processes 414 and 416 depict the division of organizational process 412 between database 402 and database 404. For example, organizational process 412 is conceptually represented by the sequence of tasks 1, 2, 3, 4, 5, 6, 7, 8, 9, and 10, where sub-organizational process 414 includes tasks 3, 4, 5, 9, and 10 and sub-organizational process 416 includes tasks 1, 2, 6, 7, and 8.

In some embodiments, a given Process Abstraction Layer can be configured for one or a subset of specific organizational processes, such as organizational process 412. For example, a specific organizational process can be broken into value-added and ordered tasks (e.g., tasks 1-10), and key data fields (e.g., within a data model) can be identified for the tasks themselves and/or for transitioning from task to task. For example, coordinated data fields can be mapped to the tasks 1-10 and the boundary states/inflection points among them such that contextualized data that propels organizational process 412 forward is defined for synchronization in the reflection database architecture.

In the illustrated embodiment, database 402 is used to accomplish tasks 3, 4, 5, 9, and 10, for example through coordinated data fields mapped to the database. Similarly, database 404 is used to accomplish tasks 1, 2, 6, 7, and 8 through coordinated data fields mapped to the database. For example, the coordinated data fields at database 402 can be accessed, edited, or otherwise used to accomplish tasks 3, 4, 5, 9, and 10 while the coordinated data fields at second database 404 can be accessed, edited, or otherwise used to accomplish tasks 1, 2, 6, 7, and 8.

In some embodiments, through the Process Abstraction Layer the coordinated data fields mapped at databases 402 and 404 are accessed or edited using cloud 410 and one or more interfaces, such as coordinator interfaces. For example, coordinator interfaces can be designed for one or a series of tasks and the mapped data fields for the task(s), where the interface itself is designed to access or edit the data fields such that the overall organizational process can progress. Examples of coordinator interfaces are further disclosed with reference to FIGS. 5, 6A, 6B, 7A, 7B, 7C, 7D, and 7E.

In the illustrated embodiment of FIG. 4, the division of organizational process 412 depicts a first group of tasks 1 and 2, a second group of tasks 3, 4, and 5, a third group of tasks 6, 7, and 8, and a fourth group of tasks 9 and 10, where the second and fourth groups of tasks are part of sub-organizational process 414 and the first and third groups of tasks are part of sub-organizational process 416. In some embodiments, one or more coordinator interfaces can be designed for the first group of tasks such that the interface(s) can be used to access and/or edit data fields at database 404, and ultimately to accomplish tasks 1 and 2 to propel the organizational process forward. As an illustrative example, tasks 1-10 can relate to a service provider with organizational processes related to functions like customer intake, a first phase of service performance, customer interactions during the first phase of service performance, a second phase of service performance, and so on. In a first example, tasks 1-10 can relate to a legal service provided to customers, such as a pending court case and/or litigation. In a second example, tasks 1-10 can relate to a health service provided to patients, such as a telemedicine doctor visit.

In the first example relating to legal service, first group of tasks 1 and 2 can involve data acquisition and entry for onboarding a client and obtaining the necessary funds to begin legal services, such as a retainer. Tasks 1 and 2 can involve data entry and access to/from database 404. Second group of tasks 3, 4, and 5 can relate to initial legal services, such as preparing legal documents, preparing contracts, preparing briefs, attending preliminary judicial proceedings, and the like. Tasks 3, 4, and 5 can include data entry and access to/from database 402. Third group of tasks 6, 7, and 8 can relate to a second phase in the legal work that requires customer interaction and/or third-party interaction, such as scheduling court dates, scheduling depositions, supplemental customer data acquisition, third party data acquisition, and the like. Tasks 6, 7, and 8 can involve data entry and access to/from database 404. Fourth group of tasks 9 and 10 can relate to execution of the second phase in the legal work, such as attending judicial proceedings, attending depositions, attending negotiations, filing court documents, and the like. Tasks 9 and 10 can include data entry and access to/from database 402.

In the second example relating to telemedicine, the first group of tasks 1 and 2 can involve data acquisition and entry for onboarding a new patient, setting up a telemedicine appointment, and the like. Tasks 1 and 2 can involve data entry and access to/from database 404. Second group of tasks 3, 4, and 5 can relate to initial telemedicine services, such as a telemedicine health screening, relevant document preparation for such a screening, issuing prescriptions, completing other formal requirements for a telemedicine visit, and the like. Tasks 3, 4, and 5 can include data entry and access to/from database 402. Third group of tasks 6, 7, and 8 can relate to a second phase in the telemedicine flow that requires customer interaction and/or third-party interaction, such as a set of follow-up questions for the patient, additional data acquisition, setting up a follow-up telemedicine appointment, and the like. Tasks 6, 7, and 8 can involve data entry and access to/from database 404. Fourth group of tasks 9 and 10 can relate to execution of a second phase of a telemedicine services, such as a follow-up session to address issues uncovered by the follow-up questions, a second telemedicine appointment in a serial group of appointments, and the like. Tasks 9 and 10 can include data entry and access to/from database 402.

Embodiments include progressing through tasks 1-10 for an instance of organizational process 412. For example, each row of a table (e.g., client or customer data table) can represent a separate entity, and tasks 1-10 can be performed for each of these entities. In some embodiments, the creation of a new entity (e.g., addition of a row in a client or customer data table) can trigger the progression through tasks 1-10 for an instance of organizational process 412. For example, the Process Abstraction Layer for organizational process 412 can be used to progress each instance of the organizational process through tasks 1-10. In some embodiments, the updating of data for one or a set of fields (e.g., columns of a row in a client/customer data table) can trigger an instance of an organizational process (e.g., for the row of the data table). In some embodiments, several instances of organizational process 412 can be occurring at any given point in time using databases 402 and 404 (and/or several instances of several organizational processes). In some embodiments, instances of an organizational process can be defined/separated/distinguished using any other suitable techniques.

In both the first and second examples, because each task or group of tasks access/edit only one of databases 402 and 404, the databases selectively synchronize contextualized data 408 as organizational process 412 progresses, thus providing each task or group of tasks with the necessary and sufficient data to complete the work associated with the task(s). The points at which organizational process 412 shift from sub-organizational process 414 to sub-organizational process 416, or vice versa, are inflection points. For example, once task 2 is completed in the illustrated embodiment an inflection point is reached (since task 3 is part of sub-organizational process 416). An inflection point can also be understood as where the derivative of the work being done to progress a particular organizational process changes from positive to negative (or negative to positive across the reflection architecture). In some instances, inflection points signal that an established process boundary is being crossed.

Consider an inflection point (e.g., hand off) between the final step of onboarding a client or patient (e.g., example task 2) and the first step of a legal or medical service (e.g., example task 3). This is an inflection point because the onboarding tasks have met the value requirements and produced the necessary conditions in number, quality, and cost (e.g., input/edited the necessary and sufficient data) to cross over the onboarding process boundary to the legal or medical service process boundary. In some embodiments, a state driven synchronization is triggered when a bi-directional synchronization engine detects that the inflection point/process boundary is achieved. Because the inflection point/process boundary achieved for organizational process 412 shifts from sub-organizational process 416 to sub-organizational process 414, the synchronization engine syncs from database 404 to database 402. For example, the bi-directional synchronization engine can sync contextualized data 408 from database 404 to database 402.

In some embodiments, contextualized data 408 does not include every piece of data updated through progressing organizational process 412, but rather the data necessary and sufficient to continue progression. For example, tasks 1 and 2 may edit or add several pieces of data, such as 10 different data fields in a new row of a customer data table (e.g., at database 404). In this example, it may be necessary and sufficient to synchronize only 7 of the 10 data fields that are updated/added through completing tasks 1 and 2. Thus, contextualized data 408 will include these 7 data fields, and the bi-directional synchronization engine can be configured to synchronize these 7 data fields in the direction of database 404 to database 402. In some embodiments, the Process Abstraction Layer defines that these 10 data fields can be mapped for tasks 1 and 2, and these 7 data fields can be mapped as contextualized data 408 for the inflection point/boundary state between tasks 2 and 3.

In some embodiments, a given Process Abstraction Layer can be configured for one or a subset of specific organizational processes, such as organizational process 412. For example, a specific organizational process can be broken into ordered tasks (e.g., tasks 1-10), and key data fields (e.g., within a data model) can be identified for the tasks themselves and/or for transitioning from task to task. Contextualized data 408 is defined in the Process Abstraction Layer based on these identified key data fields. For example, contextualized data 408 can be defined for each inflection point/boundary state within the specific organizational process.

In some embodiments, contextualized data 408 can differ for each boundary state/inflection point. Given example organizational process 412, the inflection points/boundary states within example ordered tasks 1-10 exist between tasks 2 and 3, between tasks 5 and 6, and between tasks 8 and 9. Each inflection point/boundary state can have its own set of contextualized data 408 defined within the Process Abstraction Layer. The identification and mapping of data fields within a data model (e.g., data tables and columns in a source database, primary database, or any suitable database) for a given Process Abstraction Layer can be performed manually, through automated techniques, any combination of these, or in any other suitable manner.

In some embodiments, the Process Abstraction Layer can also define the criteria for meeting an inflection point/boundary state. Considering the described example and tasks 1-10 of organizational process 412, the Process Abstraction Layer can define a criteria for reaching the inflection point/boundary state between tasks 2 and 3. In the described example, tasks 2 and 3 include 10 mapped data fields and the contextualized data for the inflection point/boundary state can include 7 mapped data fields. The inflection point/boundary state criteria can include any combination of the 10 mapped data fields, the 7 mapped data fields, and any other suitable data fields, and the criteria data fields can be monitored (e.g., by the bi-directional synchronization engine) to detect when they meet the specific inflection point/boundary state criteria (e.g., criteria for the inflection point/boundary state between tasks 2 and 3). Examples of criteria for an inflection point and/or boundary state are disclosed with reference to FIG. 10. In some embodiments, the criteria data fields can include some, all, or none of contextualized data 408 for the inflection point/boundary state between tasks 2 and 3.

Once organizational process 412 shifts from sub-organizational process 416 to sub-organizational process 414 by way of the inflection point and process boundary between tasks 2 and 3, progression can continue through tasks 3, 4, and 5. Database 402 and the contextualized data 408 synced from database 404 (e.g., data that was stored or edited by completing tasks 1 and 2) can then be used to accomplish tasks 3, 4, and 5. In the first example tasks relating to legal service, tasks 3, 4, and 5 can include performing a first phase of a legal service and editing or adding data at database 402 relevant to the performed services. Similarly, in the second example tasks relating to telemedicine service, tasks 3, 4, and 5 can include performing a first phase of a telemedicine service and editing or adding data at database 402 relevant to the performed services.

In some embodiments, between tasks 5 and 6 another inflection point and boundary state is achieved. For example, organizational process 412 can shift from sub-organizational process 414 to sub-organizational process 416 by way of the inflection point and process boundary between tasks 5 and 6. In this example, because the inflection point/process boundary achieved for organizational process 412 shifts from sub-organizational process 414 to sub-organizational process 416, the synchronization engine syncs from database 402 to database 404. For example, the bi-directional synchronization engine can sync contextualized data 408 from database 402 to database 404. Similar to contextualized data 408 discussed above with reference to the inflection point/process boundary between tasks 2 and 3, contextualized data 408 includes data necessary and sufficient to perform tasks 6, 7, and 8.

Once organizational process 412 shifts from sub-organizational process 414 to sub-organizational process 416 by way of the inflection point and process boundary between tasks 5 and 6, progression can continue through tasks 6, 7, and 8. Database 404 and the contextualized data 408 synced from database 402 (e.g., data that was stored or edited by completing tasks 3, 4, and 5) can then be used to accomplish tasks 6, 7, and 8. In the first example tasks relating to legal service, tasks 6, 7, and 8 can include a second phase in the legal services that requires customer interaction and/or third-party interaction, such as scheduling court dates, scheduling depositions, supplemental customer data acquisition, third party data acquisition, and the like, and data can be added or edited at database 404. Similarly, in the second example tasks relating to telemedicine service, tasks 6, 7, and 8 can include a second phase in the telemedicine flow that requires customer interaction and/or third-party interaction, such as a set of follow-up questions for the patient, additional data acquisition, setting up a follow-up telemedicine appointment, and the like, and data can be added or edited at database 404.

In some embodiments, between tasks 8 and 9 another inflection point and process boundary is achieved. For example, organizational process 412 can shift from sub-organizational process 416 to sub-organizational process 414 by way of the inflection point and process boundary between tasks 8 and 9. In this example, because the inflection point/process boundary achieved for organizational process 412 shifts from sub-organizational process 416 to sub-organizational process 414, the synchronization engine syncs from database 404 to database 402. For example, the bi-directional synchronization engine can sync contextualized data 408 from database 404 to database 402. Similar to contextualized data 408 discussed above with reference to the inflection point/process boundary between tasks 2 and 3 and between tasks 5 and 6, contextualized data 408 includes data necessary and sufficient to perform tasks 9 and 10.

Once organizational process 412 shifts from sub-organizational process 416 to sub-organizational process 414 by way of the inflection point and process boundary between tasks 8 and 9, progression can continue through tasks 9 and 10. Database 402 and the contextualized data 408 synced from database 404 (e.g., data that was stored or edited by completing tasks 6, 7, and 8) can then be used to accomplish tasks 9 and 10. In some embodiments, organizational process 412 can terminate at task 10, the process can repeat and begin at task 1 or any other suitable task in the process, or the process can continue to task 11 and beyond.

Embodiments of the reflection database architecture weave back and forth between a first database and a second database (e.g., database 402 and database 404), selectively synchronizing contextualized data fields that are necessary and sufficient to progress an organizational process (e.g., organizational process 412). The architecture itself is able to transcend conventional process boundary limitations through embodiments of the Process Abstraction Layer, which abstracts the organizational process in a manner that incorporates process into the architecture. In particular, the Process Abstraction Layer specifies, at different points of the organizational process, contextualized data to sync and data fields to monitor (e.g., until a next sync). Thus, the weave back and forth, propelled by selective and contextualized data that meets a value add criteria, is able to move process forward using the architectural structure itself.

Figure 5:
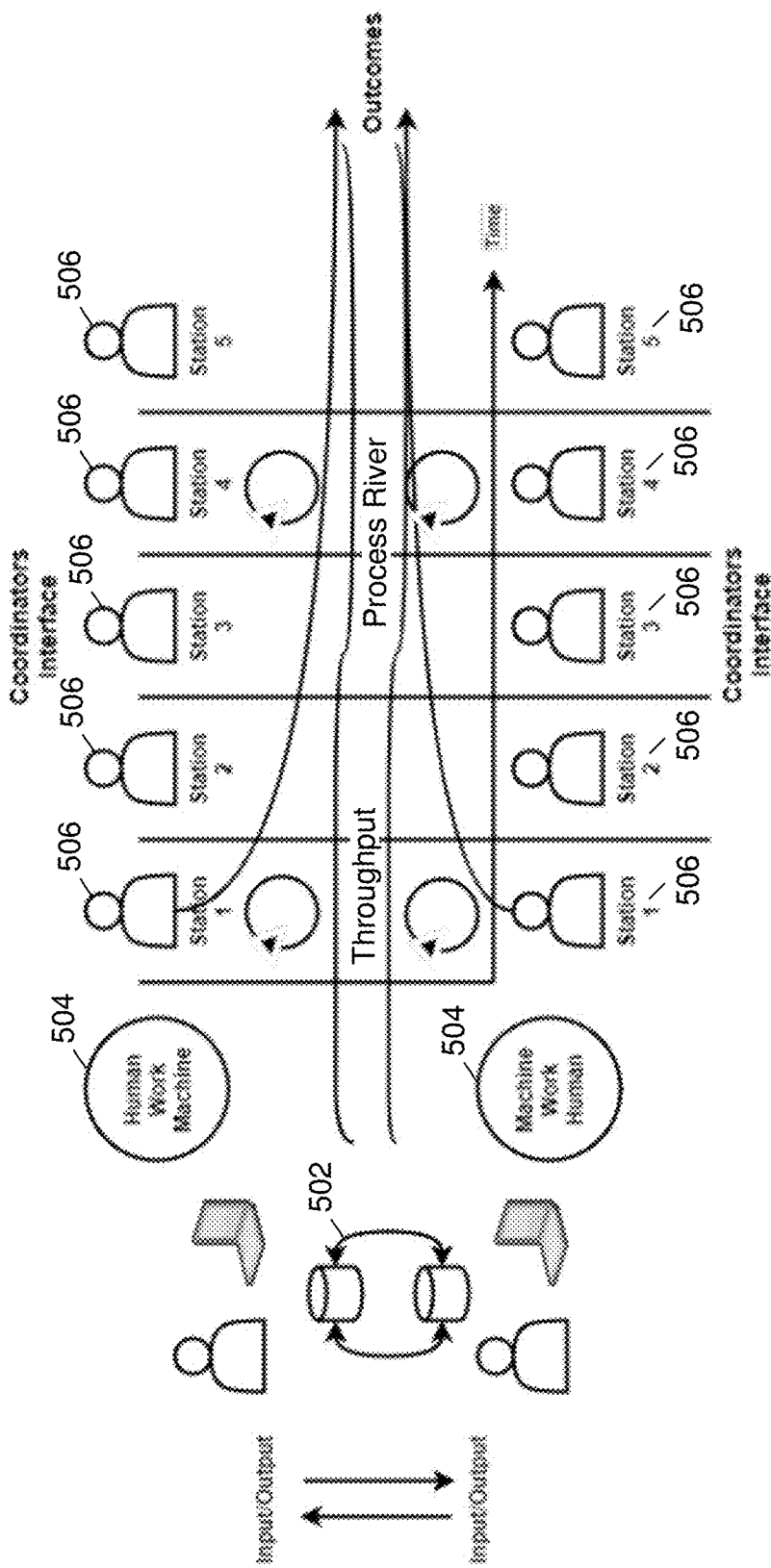
FIG. 5 illustrates coordinator interfaces that progress organizational processes according to an example embodiment.

In some embodiments, at least a portion of tasks 1-10 are performed using interfaces to access and edit data stored at database 402 and/or database 404. For example, one or more coordinated data fields (e.g., mapped as part of the Process Abstraction Layer) for tasks 1-10 can be updated or edited using coordinator interfaces designed for tasks or groups of tasks. FIG. 5 illustrates interfaces for the reflection database architecture according to an example embodiment. FIG. 5 depicts database architecture 502 (e.g., a reflection database architecture), workers 504, and coordinator interfaces 506. In some embodiments, coordinator interfaces 506 are used to access, edit, and/or manipulate coordinated data fields (e.g., mapped as part of the Process Abstraction Layer) of database architecture 502 in order to progress an organizational process.

In some embodiments, interfaces 506 can be customized webpages, a configured web application or dashboard, a smartphone application (e.g., native or web application), or any other suitable software abstraction that enables a user to access, edit, or manipulate data fields of a database. For example, interfaces 506 can include a series of web forms in any suitable layout that are configured to receive input from a user. Interfaces 506 can also be configured to use the input received to update or add data to tables and fields of database architecture 502, for example using one or more database connections, targeted SQL commands, webhooks, a business logic layer, and the like. In some embodiments, interfaces 506 can utilize an extract, transform, and load ("ETU") utility to create, read, update, or delete data stored at a database.

In some embodiments, interfaces 506 display data pulled from a database at each load of the interface, thus ensuring a display of fresh data. For example, an interface element (e.g., button) can load fresh data into interfaces 506 pulled from a connected database. In some embodiments, interfaces 506 can display cached data (e.g., data cached locally rather than pulled from a database), fresh data, or any combination of these. Interfaces 506 can be implemented using any scripting language, web technology, or any other suitable technology, such as Hypertext transfer protocol ("HTTP"), HTML5, Java, JavaScript, any suitable JavaScript package (e.g., Node.js, React, and the like), Java Server Pages ("JSP"), Java Server Faces ("JSF"), PHP: Hypertext Preprocessor ("PHP"), Perl, Python, Active Server Pages ("ASP"), .NET technologies, J2EE technologies, Jamstack technologies, and the like.

In some embodiments, workers 504 are one or more human workers that use one or more coordinator interfaces 506 to access and/or edit data fields stored at database architecture 502, perform tasks (e.g., example tasks 1-10), and ultimately achieve a desired outcome (e.g., performing legal services to accomplish a legal outcome, performing telemedicine services to resolve a patient's medical issue, any other suitable service outcome, and the like). For example, database architecture 502, the state driven bi-directional synchronization implemented by the architecture, and the performance of tasks by workers 504 using coordinator interfaces 506 support the progression of an organizational process to achieve an organizational process outcome.

In some implementations, when an organizational process reaches an inflection point that is a process boundary, different resources and specialization are relevant to operate within the new boundary area. The Process Abstraction Layer (aided by the coordinator interfaces) realizes process boundaries within the database architecture itself that can exist beyond conventional application layers. For example, application layer boundaries run off hard boundaries provided by memory management hardware that make inter-process movement and control, data transfer, and data mobilization comparatively expensive and cumbersome. The Process Abstraction Layer and reflection database architecture build process boundaries into the data sharing mechanism of the architecture (e.g., state driven synchronization of contextual data), thus managing the data necessary and sufficient for progressing an organizational process along with managing the shift of the organizational process to a new boundary area.

Figure 6A:
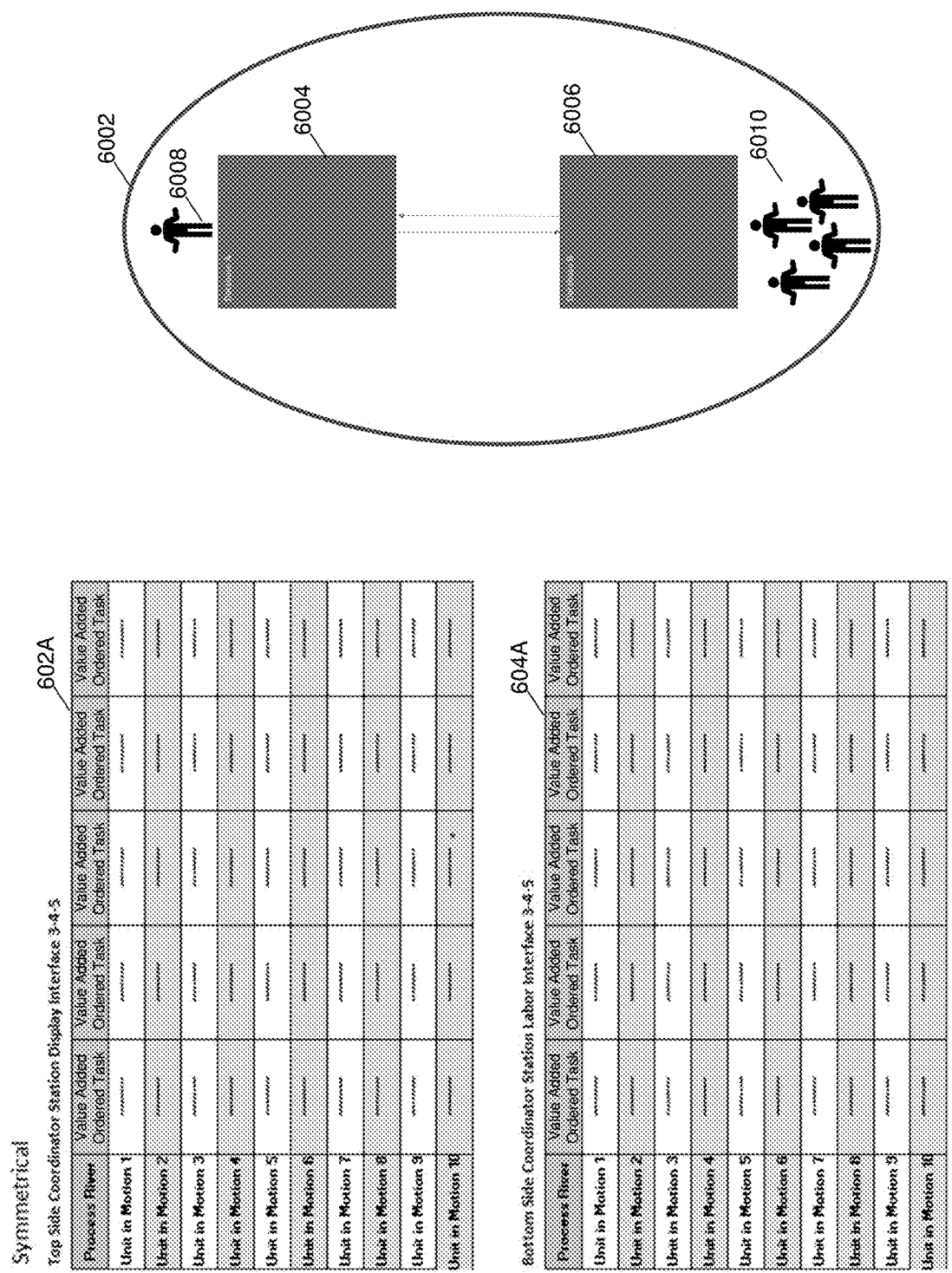
FIGS. 6A and 6B illustrate coordinator interfaces and data states for the reflection database architecture according to an example embodiment.
Figure 6B:
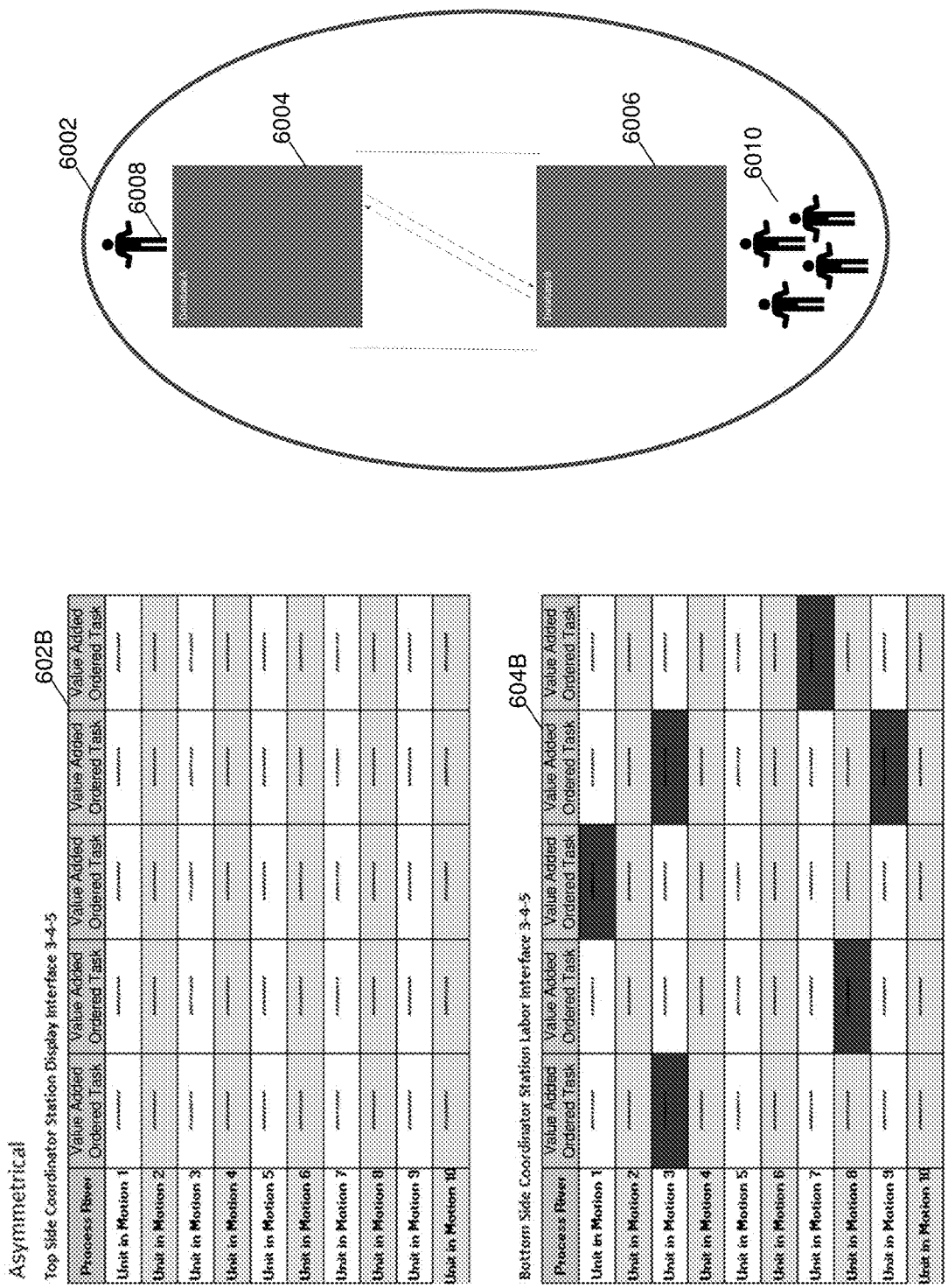

FIGS. 6A and 6B illustrate coordinator interfaces and data states for the reflection database architecture according to an example embodiment. FIG. 6A depicts coordinator interface 602A, coordinator interface 604A, database architecture 6002, database 6004, database 6006, worker 6008, and workers 6010. Similarly, FIG. 6B depicts coordinator interface 602B, coordinator interface 604B, database architecture 6002, database 6004, database 6006, worker 6008, and workers 6010.

FIG. 6A depicts a symmetric alignment, where database 6004 and database 6006 have been synchronized to reflect the same data state (e.g., same data state for the contextualized data as defined by the Process Abstraction Layer). For example, the symmetric alignment may be achieved once an inflection point and/or boundary state is achieved and a state driven synchronization is performed by a bi-directional synchronization engine.

FIG. 6B depicts an asymmetric alignment, where database 6004 and database 6006 are not synchronized and do not reflect the same data state (e.g., do not reflect the same data state for the contextualized data as configured by the Process Abstraction Layer). For example, the asymmetric alignment may be maintained while tasks are being performed by human workers 6010 using coordinator interface 604B, and the asymmetry may be maintained until an inflection point and/or boundary state is achieved (e.g., triggering synchronization).

Coordinator interface 604B shows highlighted data cells, or data fields within one or more data tables, that have been added or updated by workers 6010 using coordinator interface 604B to perform tasks. In some embodiments, these data fields are updated or added at database 6006, but are not updated or added at database 6004. For example, these data fields can be part of the contextualized data for synchronization across the databases. In other words, these data fields can be mapped coordinated data fields for the one or more tasks that are accomplished using coordinator interface 604B as defined in the Process Abstraction Layer. Once an inflection point and/or boundary state is achieved (e.g., as detected by the bi-directional synchronization engine by the monitoring of the data state for data stored at database 6006) the data corresponding to the highlighted data cells (e.g., contextualized data) can be synchronized from database 6006 to database 6004, and an organizational process can continue to progress (e.g., such that a next task in the organizational process can be performed using database 6004).

In some embodiments, worker 6008 can access coordinator interface 604A by providing credentials that permit access to the interface. For example, coordinator interface 604A may be secured by access restrictions such that only one, a few, or a subset of workers are able to access the interface. Workers 6008 can be granted access to one or a subset of coordinator interfaces by associating workers with usernames (e.g., authenticated usernames) and by an administrator granting usernames access to one or a subset of coordinator interfaces.

In some embodiments, worker 6008 may gain access to coordinator interface 604A through identity authentication, such as by providing a username and password (e.g., a username that is permitted access to the interface), two-factor authentication input (e.g., by using an authenticator application, one-time password, and the like), or using any other suitable identity authentication techniques. Embodiments that secure coordinator interfaces using access restrictions can further improve data security, implement layered security protocols (e.g., grant minimal access to coordinator interfaces that relate to sensitive data), and enable partially trusted workers access to data that matches their trust level (e.g., enable partially trusted workers to progress organizational processes without requiring full vetting/full data access rights).

FIGS. 7A, 7B, 7C, 7D, and 7E illustrate coordinator interfaces, inflection points, and boundary states for the reflection database architecture according to an example embodiment. For example, FIGS. 7A, 7B, 7C, 7D, and 7E depict the process river 7012 progression through an organizational process, and the data states at databases 7004 and 7006 (which together comprise database architecture 7002) at different stages of the organizational process as time progresses. For example, coordinator interfaces 702A, 702B, 702C, 702D, and 702E can be used by worker 7008 to perform tasks and update or add data to database 7004 while coordinator interfaces 704A, 704B, 704C, 704D, and 704E can be used by workers 7010 to perform tasks and update or add data to database 7006.

Figure 7A:
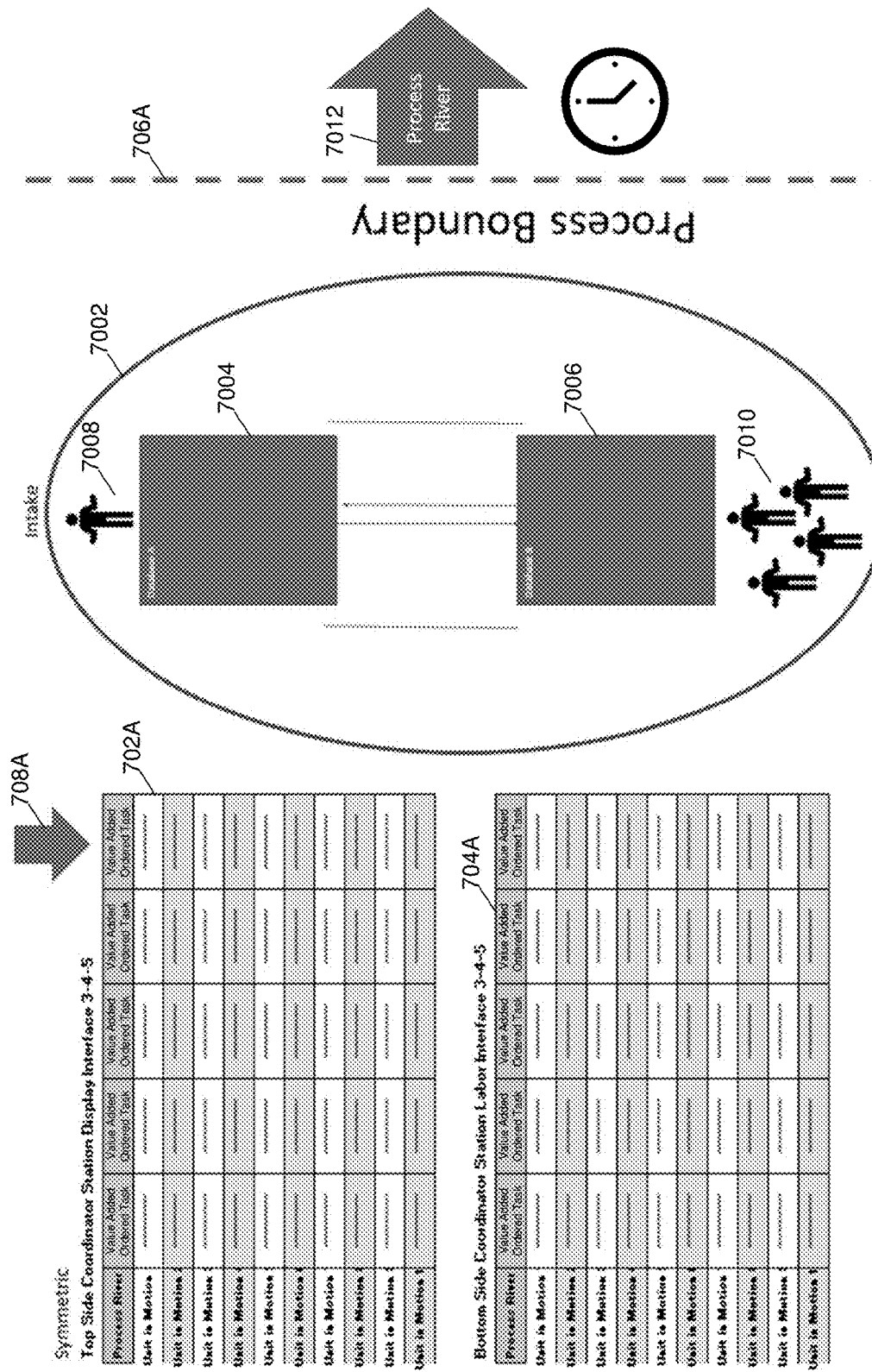
FIGS. 7A, 7B, 7C, 7D, and 7E illustrate coordinator interfaces, inflection points, and boundary states for the reflection database architecture according to an example embodiment.

In the illustrated embodiment, FIG. 7A depicts that databases 7004 and 7006 are symmetric, for example because an inflection point 708A and/or process boundary 706A triggered a state driven synchronization to achieve symmetry of the databases. Coordinator interfaces 702A and 704A also depict this symmetric state. For example, workers 7008 and/or 7010 can perform tasks related to an organizational process and use one or both of the coordinator interfaces 702A and 704A to update/add data at one or both of databases 7004 and 7006. After arriving at process boundary 706A, the state driven synchronization can be performed and the organizational process can continue past process boundary 706A to the next boundary area, depicted by FIG. 7B.

Figure 7B:
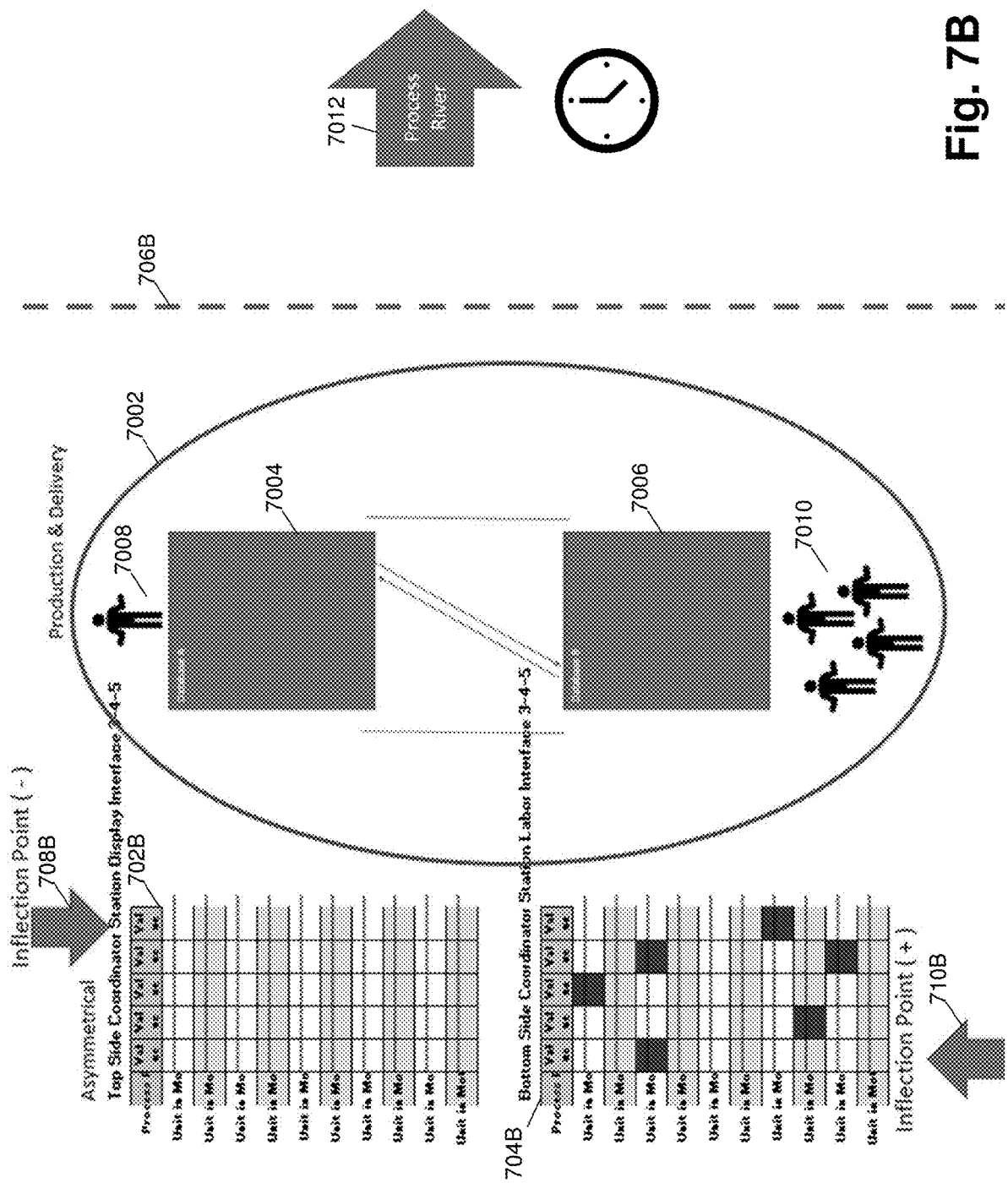

FIG. 7B depicts that databases 7004 and 7006 are asymmetric. For example, workers 7010 can perform tasks and use coordinator interface 704B to update/add data at database 7006. Once the data at database 7006 reaches inflection point 708B, 7108 and/or boundary state 706B (e.g., the mapped data fields at the database achieve a state sufficient to progress the organizational process to the next phase, or set of tasks), the bi-directional synchronization engine can selectively synchronize contextual data from database 7006 to database 7004 to reach symmetry across the databases (similar to the symmetry depicted in FIG. 7A). After arriving at process boundary 706B and performing the state driven contextual synchronization, the organizational process can continue past process boundary 706B to the next boundary area, depicted by FIG. 7C.

Figure 7C:
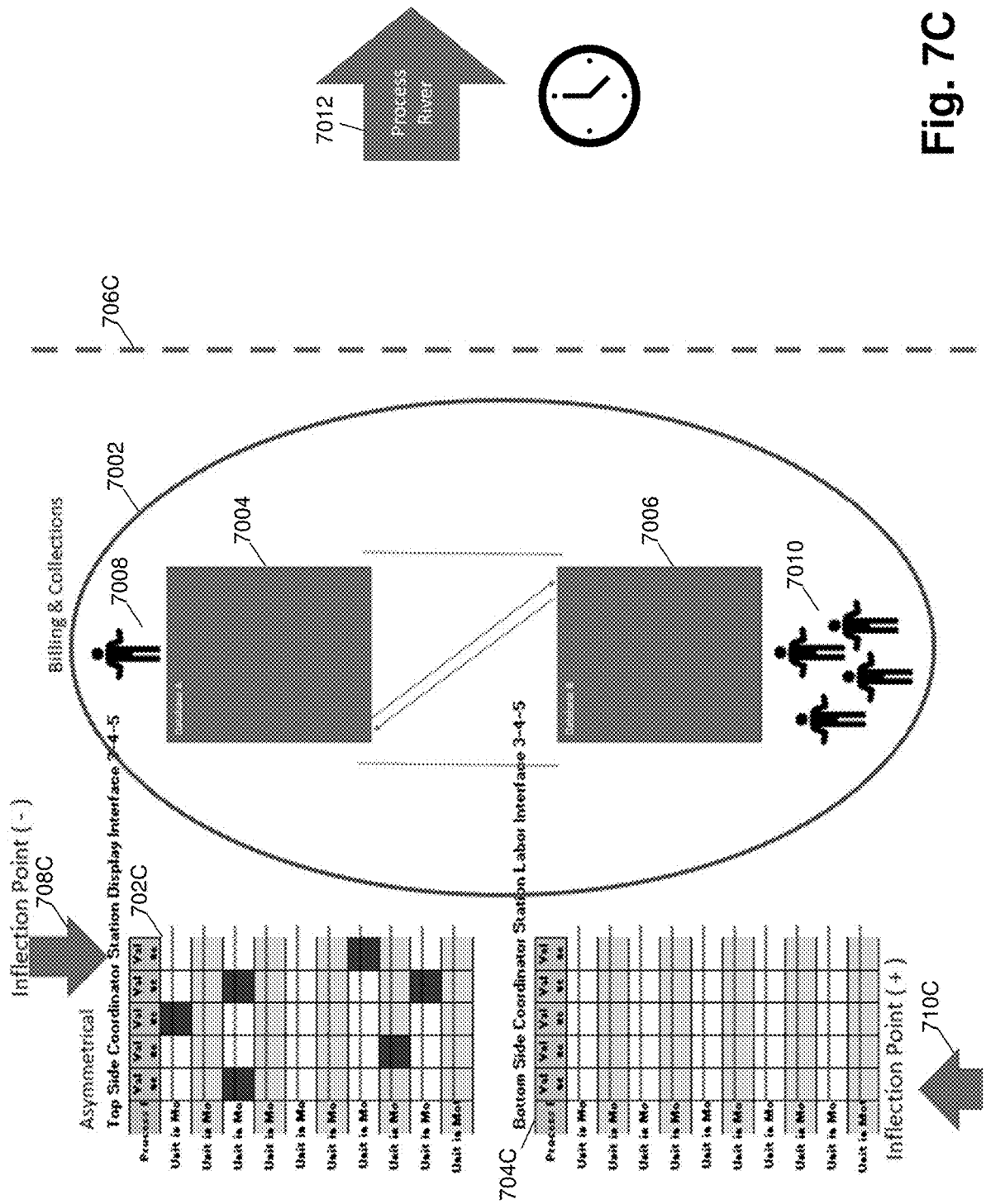

FIG. 7C depicts that databases 7004 and 7006 are asymmetric. For example, worker 7008 can perform tasks and use coordinator interface 702C to update/add data at database 7004. Once the data at database 7004 reaches inflection point 708C, 710C and/or boundary state 706C, the bi-directional synchronization engine can selectively synchronize contextual data from database 7004 to database 7006 to reach symmetry across the databases. After arriving at process boundary 706C and performing the state driven contextual synchronization, the organizational process can continue past process boundary 706C to the next boundary area, depicted by FIG. 7D.

Figure 7D:
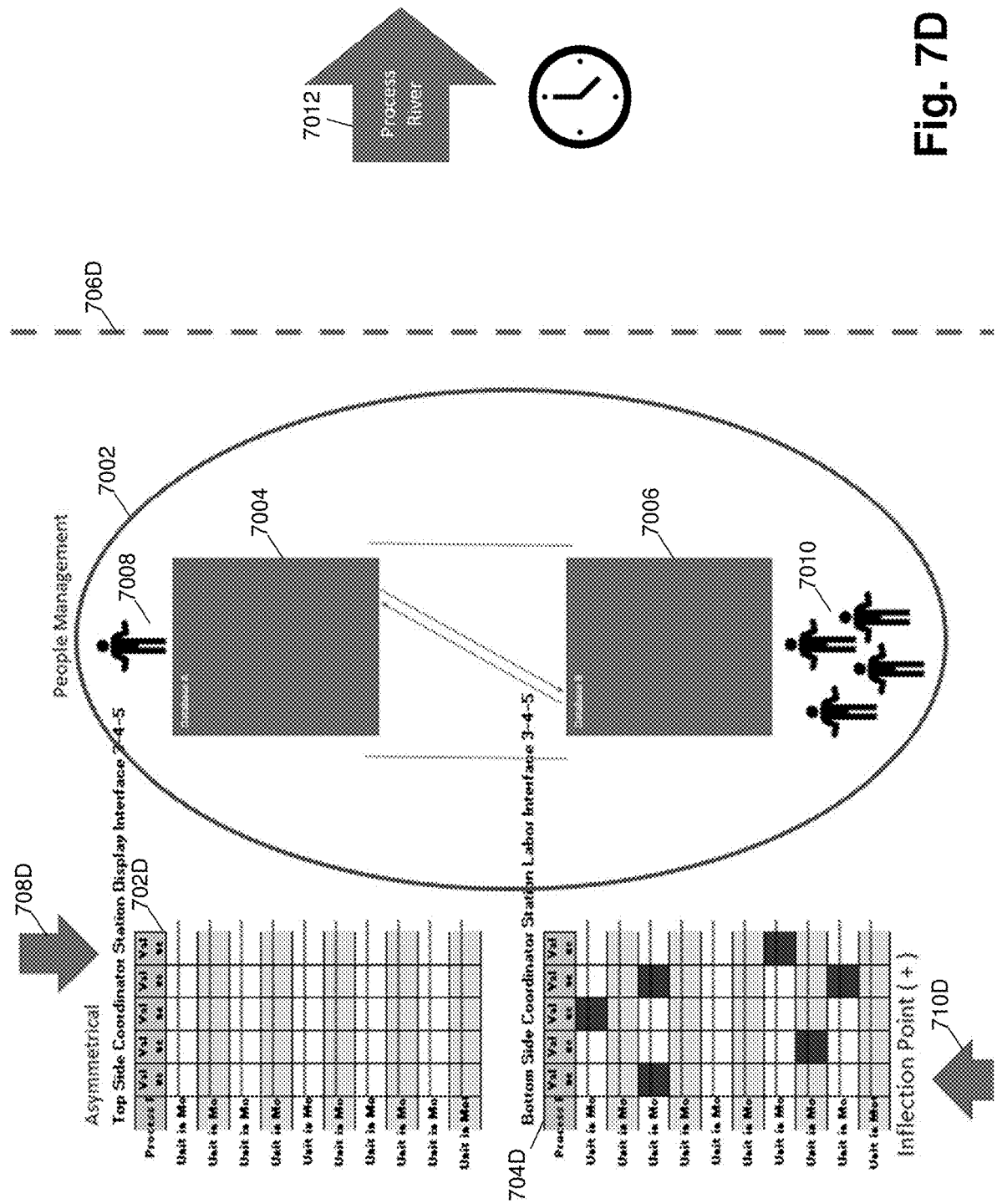

FIG. 7D depicts that databases 7004 and 7006 are asymmetric. For example, workers 7010 can perform tasks and use coordinator interface 704D to update/add data at database 7006. Once the data at database 7006 reaches inflection point 708D, 710D and/or boundary state 706D, the bi-directional synchronization engine can selectively synchronize contextual data from database 7006 to database 7004 to reach symmetry across the databases. After arriving at process boundary 706D and performing the state driven contextual synchronization, the organizational process can continue past process boundary 706D to the next boundary area, depicted by FIG. 7E.

Figure 7E:
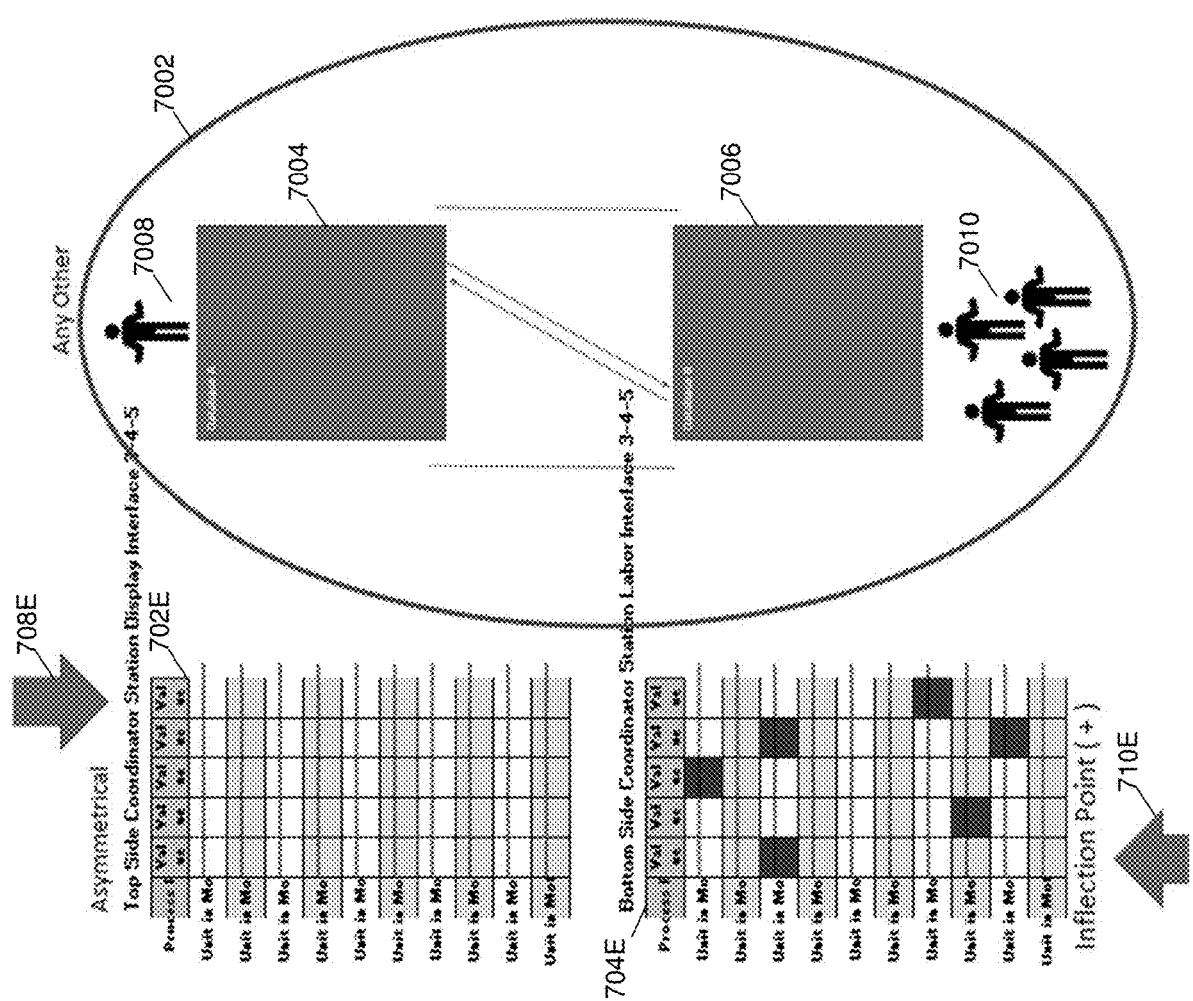

FIG. 7E depicts that databases 7004 and 7006 are asymmetric. For example, worker 7008 can perform tasks and use coordinator interface 702E to update/add data at database 7004. Once the data at database 7004 reaches inflection point 708E and/or 710E, the bi-directional synchronization engine can selectively synchronize contextual data from database 7004 to database 7006 to reach symmetry across the databases. In some embodiments, the organizational process can terminate after the state depicted in FIG. 7E, the process can repeat from the initial boundary area (depicted in FIG. 7A) or any other suitable boundary area, or the process can continue.

In some embodiments, FIGS. 7A, 7B, 7C, 7D, and 7E depict database 7004 as a top level database (e.g., source database) and database 7006 as a bottom level database (e.g., reflection database). Examples of an organizational process can include the first example relating to legal service and the second example relating to telemedicine, as discussed with reference to FIG. 4 and tasks 1-10. In the scenario where database 7004 is a top level database and database 7006 is a bottom level database, these example organizational processes can progress via tasks 1-10 as workers 7008 and 7010 perform the tasks and use the depicted coordinator interfaces to update/add data to databases 7004 and 7006. In some embodiments, the boundary states 706A, 706B, 706C, and 706D can be similar to the boundary states between groups of tasks disclosed with reference to FIG. 4 (e.g., between tasks 2 and 3, between tasks 5 and 6, between tasks 8 and 9, and the like).

In some embodiments, coordinator interfaces 702A, 702B, 702C, 702D, and 702E can create, read, update, or delete data stored at database 7004 and coordinator interfaces 704A, 704B, 704C, 704D, and 704E can create, read, update, or delete data stored at database 7004. Accordingly, data displayed at coordinator interfaces 702A, 702B, 702C, 702D, and 702E is accessed from database 7004 and data displayed at coordinator interfaces 704A, 704B, 704C, 704D, and 704E is accessed from database 7006. Each of these coordinator interfaces is associated with one or more tasks, such as one or more of the tasks 1-10 discussed with reference to FIG. 4.

In some embodiments, the state of data at database 7006 can be used to populate data into one or more of coordinator interfaces 704A, 704B, 704C, 704D, and 704E when the state of the data indicates that the organizational process (e.g., instance of the organizational process, such as row of data) is at the task relevant to the particular coordinator interface. For example, interface 704B may be associated with tasks 3, 4, and 5 of an ordered set of tasks 1-10. The state of one or more mapped data fields (e.g., defined in the Process Abstraction Layer for the organizational process) can be used to detect the relevant task (e.g., for an instance of the organizational process, such as a row of data from a specific table (the customer table)). In other words, the mapped data fields defined in the Process Abstraction Layer and the detected states of these mapped data fields at database 7006 are used to detect what data is to be displayed in coordinator interfaces 704A, 704B, 704C, 704D, and 704E.

In some embodiments, data is displayed in coordinator interface 704B when one or more of tasks 3, 4, and/or 5 are to be performed using the coordinator interface. In other words, the presence of data displayed in coordinator interface 704B indicates that the organizational process (e.g., an instance of the organizational process) is positioned such that one or more of tasks 3, 4, and/or 5 should be performed to progress the process (e.g., instance of the process). In this example, coordinator interface 704B can be used to perform one or more of tasks 3, 4, and/or 5 to progress the process. Similarly, the state of data at database 7004 can be used to populate data into one or more of coordinator interfaces 702A, 702B, 702C, 702D, and 702E when the state of the data indicates that the organizational process (e.g., instance of the process) is at the task relevant to the particular coordinator interface.

In some embodiments, workers 7010 can be a plurality of workers positioned to use one or more of coordinator interfaces 704A, 704B, 704C, 704D, and 704E to perform tasks (e.g., by accessing and/or editing database 7006) that relate to data entry, data validation, logistics, and/or administration. With reference to the first and second examples, these tasks can include interactions with the customer (e.g., client or patient) via messaging or phone calls to obtain customer data, interactions with the customer, service provide, and/or third parties to schedule appointments or meetings, interactions to obtain payments, and other support for the service provider. In this example, worker 7008 can be one or more service provider workers positioned to use one or more of coordinator interfaces 702A, 702B, 702C, 702D, and 702E to perform tasks (e.g., by accessing and/or editing database 7006) and to perform services, such as the legal services related to the first example organizational process and/or the telemedicine services related to the second example organizational process.

While workers 7008 and 7010 perform their tasks, the coordinator interfaces can be used to update/add data to databases 7004 and 7006 relevant to the given tasks (e.g., store customer data, scheduling data, service related data, and the like). In some embodiments, workers 7008 and 7010 (e.g., or any worker accessing/logged in to a coordinator interface) can be remote workers. For example, remote workers can be remote from one another, from hardware systems, from organizational locations (e.g., offices or headquarters), and generally remote workers can be located anywhere around the world given access to a computing device (and the Internet in some embodiments).

Embodiments of the coordinator interfaces implemented along with embodiments of the reflection database architecture strike synergies in a workforce. For example, the Process Abstraction Layer and reflection database architecture realize process boundaries within the architecture itself (e.g., using inflection points/boundary states), and the coordinator interfaces leverage this unique trait of the architecture to organize workforce effort. In some embodiments, specialized workers can be trained for one or a given set of coordinator interface tasks. Because the bi-directional synchronization engine synchronizes and weaves an organizational process using inflection points/boundary states (e.g., shifts the organizational process up and down across a partition between reflected databases), the architecture creates natural niche carve outs for workers to specialize on a subset of tasks (e.g., tasks within a process boundary). Embodiments of the coordinator interfaces organize this workforce effort and engage with the reflection database architecture to propel organizational processes forward with efficiency, continuity, and reliability.

As depicted in FIGS. 4, 7A, 7B, 7C, 7D, and 7E and disclosed herein, the data stored relevant to each task or group of tasks is synchronized back and forth through the reflection database architecture as contextualized data. For example, a bi-directional synchronization engine detects inflections points and/or boundary states at database 7004 and database 7006 (e.g., based on the state of mapped coordinated data fields for a task or group of tasks, as discussed with reference to FIG. 4) and performs the directional synchronization for the contextualized data. As disclosed with reference to FIGS. 7A, 7B, 7C, 7D, and 7E, tasks are performed, data is added/updated, and contextualized data is synchronized back and forth to continually progress to a desired outcome (e.g., move forward along the process river), such as the performance of a legal or telemedicine service.

Figure 8:
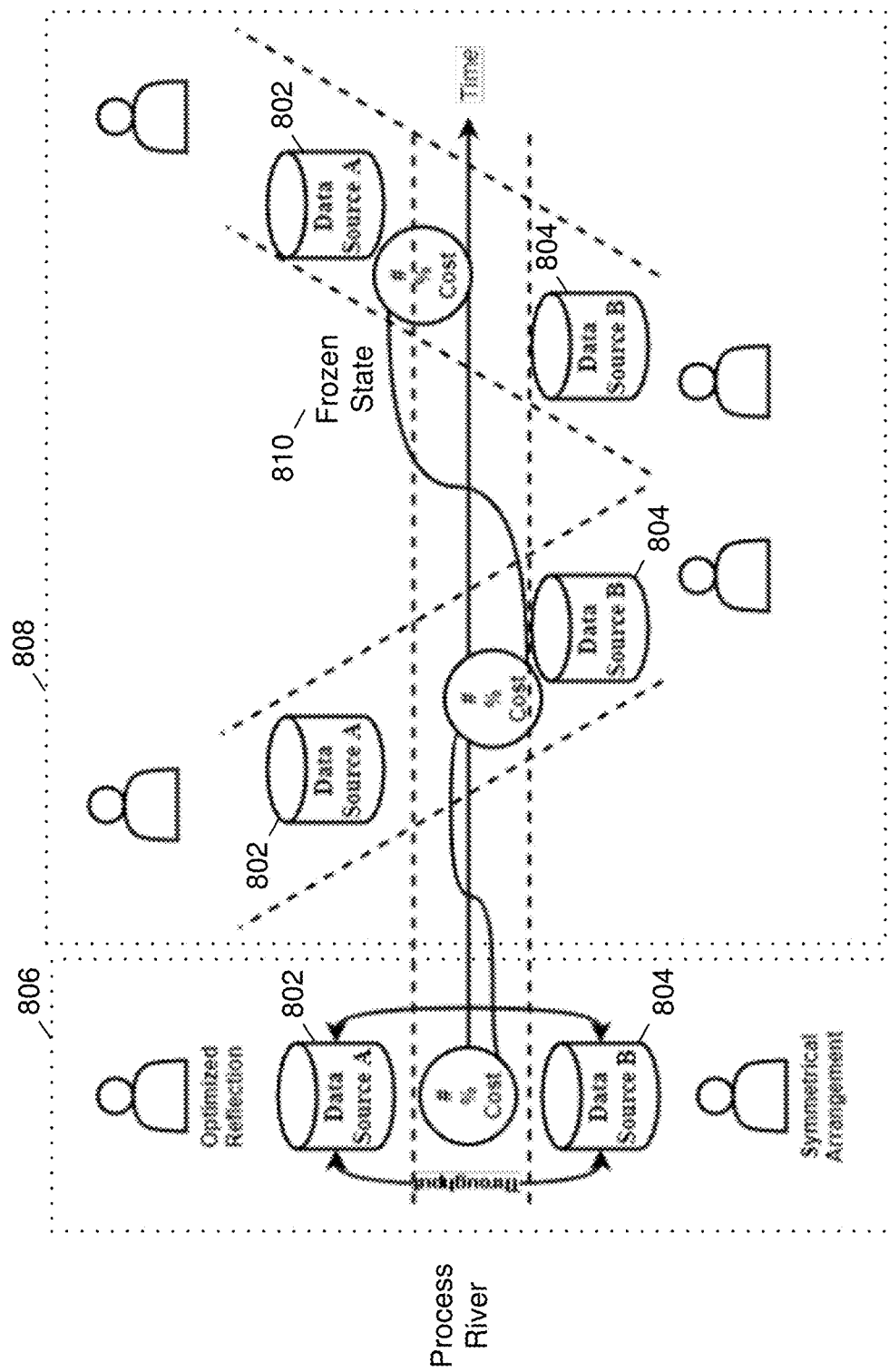
FIG. 8 illustrates various synchronization states for the reflection database architecture according to an example embodiment.

FIG. 8 illustrates various synchronization states for the reflection database architecture according to an example embodiment. Databases 802 and 804 represent a database reflection architecture and FIG. 8 depicts the database interactions as time progresses for an organizational process (e.g., along a process river) to a desired outcome. Reflection 806 represents optimized reflection behavior, where contextualized data is continually synched between databases 802 and 804 over time as inflection points/boundary states are achieved. Reflection 806 continually progresses one or more organizational processes to desired outcomes using the database reflection architecture to guide the progress.

Reflection 808 represents flawed reflection behavior, where a directional synchronization of contextual data from database 804 to database 802 is in frozen state 810. For example, this frozen state may be experienced due to a data issue at database 804 that keeps the data state (e.g., state of the mapped coordinated data fields) from reaching an inflection point/boundary state, issues experienced by one or more workers performing tasks such that the workers are unable to enter/update data at database 804 in a manner that reaches an inflection point/boundary state, improper data alignment between database 802 and 804, and other suitable causes. In other words, reflection 808 and frozen state 810 signal a hang up in the organizational process such that progress towards a desired outcome has been stalled.

Embodiments of the reflection database architecture build the organizational process into the architecture itself. As seen in FIG. 8, a stall in progress for the organizational process creates frozen state 810, or defect in the database interactions. Embodiments use mapped coordinated data fields specific to tasks or groups of tasks, inflection points and boundary states specific to different phases of the organizational process, and contextualized data specific to progressing the organizational process across phases, and these embodiments of the reflection database architecture are able to flex and move along with the organizational process as long as it continues to progress toward a desired outcome. When the organizational process stalls, so too do the database interactions, as is the case with frozen state 810.

In some implementations, reflection 808 and frozen state 810 can be used for organizational process optimization and/or to optimize the manner that the database architecture reflects the organizational process. For example, frozen state 810 may be the result of a flaw in the organizational process, such as a missing task, and this task can be added to achieve an optimized reflection. In another example, frozen state 810 may be the result of the mapped coordinated data fields of the database architecture becoming stagnant (e.g., due to underlying changes in the way the organizational process is performed by workers). In this example, the way the organizational process is mapped onto the database architecture (e.g., the Process Abstraction Layer) can be updated, again achieving an optimal reflection. In other words, embodiments achieve organizational process optimization and database architecture optimization in combination, and this optimization workflow is built into the database architecture itself.

Figure 9:
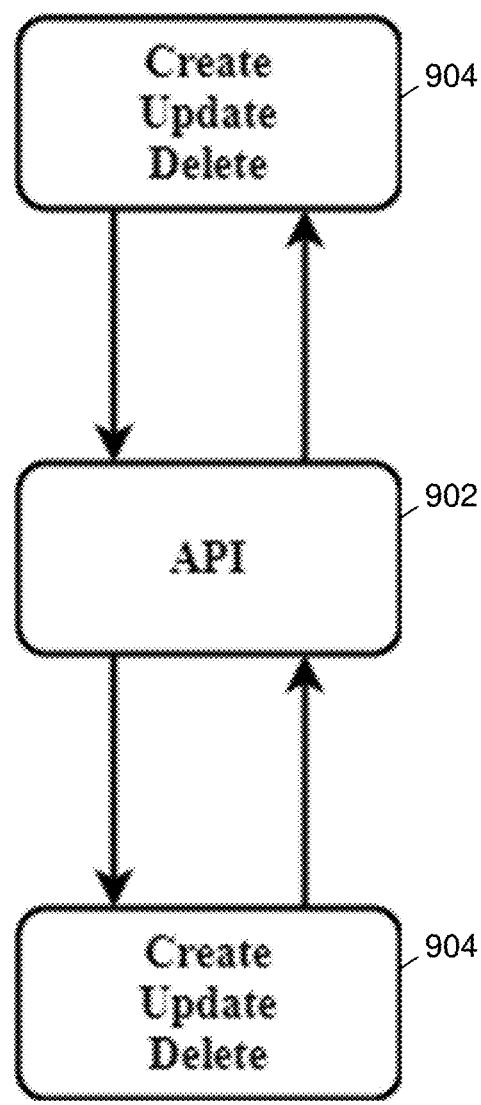
FIG. 9 illustrates programming interfaces for the reflection database architecture according to an example embodiment.

FIG. 9 illustrates programming interfaces for the reflection database architecture according to an example embodiment. In particular, FIG. 9 depicts database application programming interface ("API") 902, and Create, Update, and Delete ("CRUD") abstractions 904 for interfacing with the databases of various embodiments. For example, CRUD abstractions 904 can be used (e.g., by the coordinator interfaces/users/workers) to invoke database API 902 to create data records or fields, update data records or fields, or delete data records or fields.

For example, users at embodiments of coordinator interfaces can issue data updates to embodiments of the reflection database using the CRUD abstractions 904 and database API 902 to change the state of data at the reflection database and progress one or more organizational processes. From time to time, the state of data at a reflection database will reach an inflection point (and sometimes a boundary state), and embodiments of the bi-directional synchronization engine can detect the inflection point and perform a synchronization with embodiments of a source database. Similarly, data updates can be issued to embodiments of the source database using the CRUD abstractions 904 and database API 902 to change the state of data at the source database and progress one or more organizational processes. From time to time, the state of data at the source database will reach an inflection point (and sometimes a boundary state), and embodiments of the bi-directional synchronization engine can detect the inflection point and perform a synchronization with embodiments of the reflection database.

Figure 10:
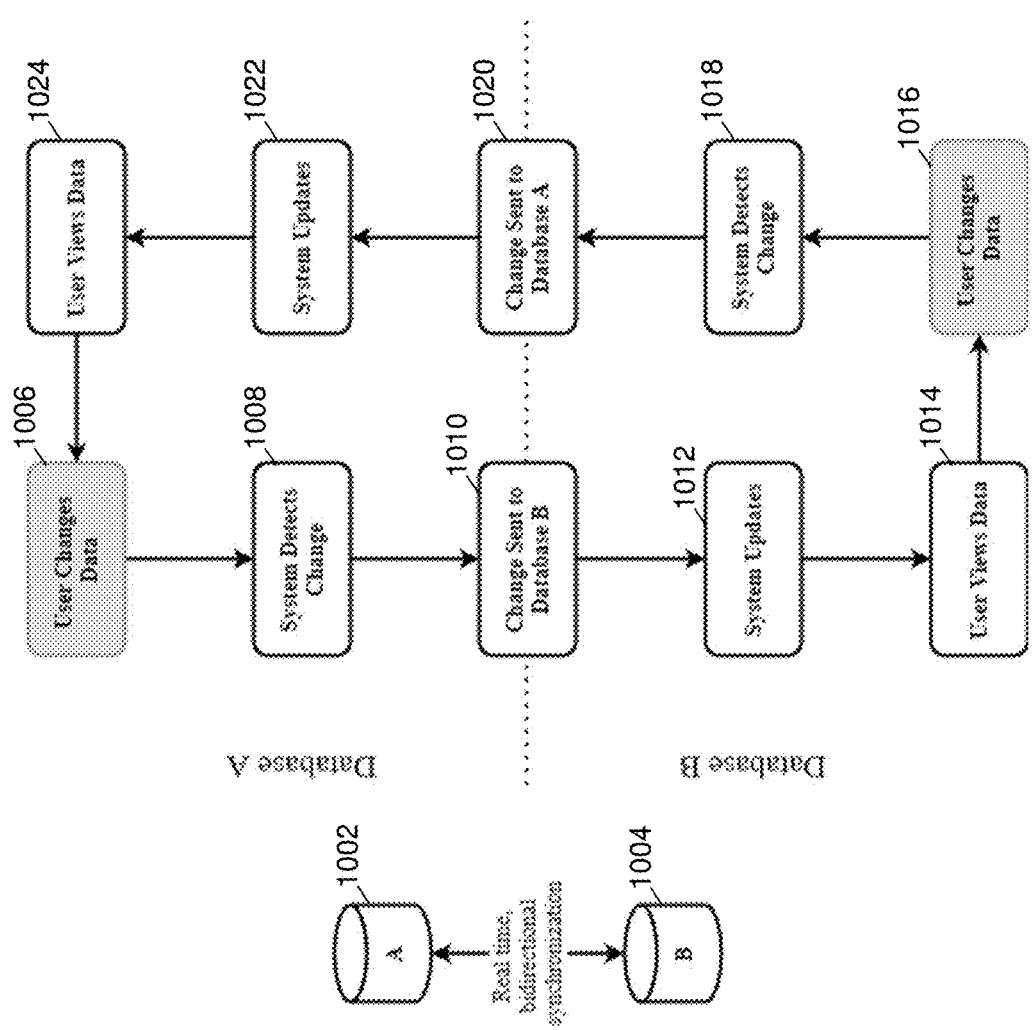
FIG. 10 illustrates a flow diagram for bi-directional state driven synchronization in a reflection database architecture according to an example embodiment.

FIG. 10 illustrates a flow diagram for bi-directional state driven synchronization in a reflection database architecture according to an example embodiment. In one embodiment, the functionality of FIG. 10 (and FIGS. 11 and 12 below) is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), and the like), or any combination of hardware and software.

FIG. 10 illustrates a database 1002 (e.g., source database) and database 1004 (e.g., reflection database). In some embodiments, a bi-directional synchronization engine can perform state driven synchronization of database 1002 and database 1004 with the flow depicted in FIG. 10.

At 1006, data stored at database 1002 can undergo a state change. For example, a user/worker interacting with a coordinator interface can manipulate the state of elements of data stored at database 1002 (e.g., to progress an organizational process). At 1008, the bi-directional synchronization engine can detect changes to the state of the data stored at database 1002. For example, an inflection point for an organizational process can be achieved by a series of state updates to the data stored at database 1002. In some embodiments, changes to the states of the series of data elements (e.g., fields or columns of one or more rows in one or more data tables) are detected when detecting that an inflection point has been reached.

In some embodiments, the detected changes include determining that the state of coordinated mapped data fields (e.g., specific to a task or group of tasks for a given phase/boundary of the organizational process) meets the criteria for an inflection point/boundary state (e.g., criteria for a specific inflection point/boundary state defined by the Process Abstraction Layer for the organizational process). For example, criteria for an inflection point and/or boundary state can include detection that a new row has been added to a table or has been deleted from a table, detection that a series of data values are present (e.g., the presence of data values for at least 5 data fields in a row of a data table, multiple rows of a data table, across multiple data tables, and the like), the detection of updates to specified data fields (e.g., the detection of updates for at least 5 data fields in a row of a data table, multiple rows of a data table, across multiple data tables, and the like), the validation of data values of specified data fields (e.g., validation that specified data fields are non-null, have a numeric value, have an alphanumeric value, are a minimum required length, are greater than, less than or equal to a fixed value, are greater than, less than, or equal to another data field, that an arithmetic function of the specified data fields is zero, non-zero, or is greater than, less than or equal to a fixed value, another specified data field, or arithmetic function of other specified data fields), detection that a threshold amount of time has elapsed since data has been added, updated, changed, or deleted (e.g., minutes, hours, days, weeks, and the like since an addition, update, or deletion was made), detection that a specified timing has been met (e.g., a day of the week, a day of the month, an hour of the day, a minute of the hour, or any other specified timing), detection of an event (e.g., detection that a button on a coordinator interface was clicked to indicate sync is ready), a combination of these, and any other suitable criteria.

At 1010, at least a portion of the state changes to the series of data elements are sent to database 1004. For example, a structure for database 1002 and database 1004 includes a reflection of at least a portion of the series of data elements, and state changes to this portion (e.g., state changes to the series of data elements experienced at database 1002) are sent to database 1004. In some embodiments, the portion of series of data elements is the contextualized data as defined in the Process Abstraction Layer (e.g., contextualized data specific to the tasks or groups of tasks relevant to the inflection point/boundary state). The state changes can include a new row of data in a data table, changes to select data fields (e.g., columns) of a row of data, a combination of these, and any other suitable state changes.

At 1012, the bi-directional synchronization engine can perform a state driven synchronization that synchronizes the portion of data elements (e.g., contextualized data) across database 1002 and database 1004 (e.g., to reflect the state changes experienced at database 1002). In other words, prior to synchronization the state of the portion of data element was asymmetric, and after the point of synchronization the state of the portion of data elements is synchronized across the two databases. The state driven synchronization can include adding a new row of data to an existing data table, updates to select data fields (e.g., columns) of a row of data, a combination of these, and any other suitable state changes.

At 1014, the state of data stored at database 1004 can be viewed. For example, in order to progress an organizational process, a user/worker (e.g., at a coordinator interface) can view the state of a data element stored at database 1004. At 1016, data stored at database 1004 can undergo state changes. For example, a user/worker interacting with a coordinator interface can manipulate the state of elements of data stored at database 1004 (e.g., to progress an organizational process).

At 1018, the bi-directional synchronization engine can detect a change to the state of the data stored at database 1004. For example, an inflection point for an organizational process can be achieved by a series of state updates to the data stored at database 1004 (e.g., made by a user/worker interacting with a coordinator interface). In some embodiments, changes to the states of the series of data elements (e.g., fields or columns of one or more data tables) are detected when detecting that an inflection point has been reached. In some embodiments, the detected changes include determining that the state of coordinated mapped data fields (e.g., specific to a task or group of tasks for a given phase/boundary of the organizational process) meets the criteria for an inflection point/boundary state (e.g., criteria for a specific inflection point/boundary state defined by the Process Abstraction Layer for the organizational process).

At 1020, at least a portion of the state changes to the series of data elements are sent to database 1002. For example, a structure for database 1002 and database 1004 includes a reflection of at least a portion of the series of data elements, and state changes to this portion (e.g., state changes to the series of data elements experienced at database 1004) are sent to database 1002. In some embodiments, the portion of series of data elements is the contextualized data as defined in the Process Abstraction Layer (e.g., contextualized data specific to the tasks or groups of tasks relevant to the inflection point/boundary state). The state changes can include a new row of data in a data table, changes to select data fields (e.g., columns) of a row of data, a combination of these, and any other suitable state changes.

At 1022, the bi-directional synchronization engine can perform a state driven synchronization that synchronizes the portion of data elements (e.g., contextualized data) across database 1002 and database 1004 (e.g., to reflect the state changes experienced at database 1004). In other words, prior to synchronization the state of the portion of data element was asymmetric, and after the point of synchronization the state of the portion of data elements is synchronized across the two databases. The state driven synchronization can include adding a new row of data to an existing data table, updates to select data fields (e.g., columns) of a row of data, a combination of these, and any other suitable state changes.

At 1024, the state of data stored at database 1002 can be viewed. For example, in order to progress an organizational process, a user/worker (e.g., at a coordinator interface) can view the state of data elements stored at database 1002. The functionality of FIG. 10 can then return back to 1006, where data stored at database 1002 can undergo a state change (e.g., to progress an organizational process). In summary, the functionality of FIG. 10 demonstrates the asymmetries and state driven synchronization of database 1002 and database 1004 as organizational processes are progressed and the state of data stored at these databases is changed.

In order to implement the bi-directional synchronization, database tables can be monitored for changes by a third-party cloud extraction, transformation, and load ("ETL") service in some embodiments. When a record is created or edited in a monitored database, the ETL service can first perform some logic to determine whether the change meets a criteria for a valid transfer of data (to avoid incomplete or "defective" data). If not, no data may be transferred. If so, a series of operations can be performed to cleanse the data (formatting of dates into the expected format for the receiving database, for example), lookup the appropriate tables and rows to update, if applicable, and modify the previous values.

For example, referring to FIG. 10, a new company record can be created in database 1002. The ETL service can verify that minimum required values are present at database 1002 (e.g., company name, unique system ID, and the like). A transfer can be initiated that connects to database 1004, navigates to the correct table, and inserts a row with the provided values. In turn, database 1004 can be updated, which causes the ETL service to find the company record in database 1002, and populate the unique system ID value provided from database 1004 into database 1002, thus creating the connection between the two databases.

In another example, a case record can be updated in database 1004. The ETL service can detect a change and poll a webhook uniform resource locator ("URL") on the server connected to database 1004 to prepare a payload of data that will be delivered to database 1002. The ETL service can be preconfigured, for example to require 5 separate data points to have a value before proceeding. The 5 values may be present in this example transaction, so the ETL service can continue and locate the corresponding row in database 1002 (based on a shared unique case number) and update the row.

In some embodiments, the bi-directional synchronization engine synchronizes data asynchronously (based on the detection of an inflection point and/or boundary state) from the reflection database to the source database, and synchronizes data synchronously from the source database to the reflection database. In other words, in the direction from the source to the reflection database data is synchronized synchronously (e.g., without lag) while in the direction from the reflection to the source database data is synchronized asynchronously (e.g., with lag, until detection of an inflection point and/or boundary state).

In some embodiments where both synchronous and asynchronous synchronization are implemented in the reflection database architecture, a top level database may drive an organizational process while a bottom level database supports the organizational process. For example, the top level database may be a customer database and the bottom level database may be a support database to support the customer. In this example, changes implemented at the top level database may disrupt the expected order of tasks in an organizational process. For example, an ordered set of tasks 1-10 may be expected in sequence, where a subset of the tasks are performed using the top level database and a subset of the tasks are performed using the bottom level database. However, an update, addition, or deletion pushed to one or more data fields at the top level database at task 6 may revert the organizational process to task 3.

In this example, embodiments of the bi-directional synchronization engine can capture and synchronize the changes made at the top level database such that the bottom level (support) database reflects the new status (e.g., that the organizational process is back to task 3). In some embodiments, a first coordinator interface can be used to access the top level database, and second and third coordinator interfaces can be used to access the bottom level database (this is just an example and both databases may be accessed using several coordinator interfaces in other examples).

For example, the second coordinator interface may be used for task 3 (along with other tasks) and the third coordinator interface may be used for task 6 (along with other tasks). When a synchronous update, addition, or deletion from the top level database pushes the organizational process backwards from task 6 to task 3, the change in the state of the data at the bottom-level database triggers the second coordinator interface to display data such that task 3 can be accomplished using the interface and similarly triggers the third coordinator interface to no longer display data to accomplish task 6 (e.g., because the organizational process is no longer at task 6).

In some embodiments, the first coordinator interface is configured to make changes, additions, or deletions to the top level database that synchronously synchronize down to the bottom level database (and thus the second and third coordinator interfaces) while the second and third coordinator interfaces are configured to make changes, additions, or deletions to the bottom level database that asynchronously synchronize up to the top level database (e.g., only synchronize when a inflection point/boundary state is reached). In other words, the first coordinator interface can be used to drive an organizational process while the second and third coordinator interfaces can be used to support the organizational process.

In some embodiments, a subset of data tables, data rows, and/or data fields at the top level database can be configured to synchronize down to the bottom level database synchronously. In some embodiments, another subset of data tables, data rows, and/or data fields at the top level database can be configured to synchronize down to the bottom level database asynchronously (e.g., based on detection of an inflection point/boundary state).

Embodiments of the reflection database architecture embed organizational process into the architecture itself through the Process Abstraction Layer. For example, the tasks or groups of tasks that comprise an organizational process can have mapped coordinated data fields defined in the Process Abstraction Layer. Inflection points and/or boundary states can be defined such that state driven synchronization across the reflection database architecture is triggered at the appropriate times to continue to drive the organizational process forward. In addition, for these detected inflection points and/or boundary states, contextualized data can be defined (e.g., in the Process Abstraction Layer) such that the data that is necessary and sufficient to drive the organizational process forward (e.g., move to the next task and/or the next boundary state) is synchronized across the databases.

Embodiments of the reflection database architecture that include an embedded organizational process support the continued progress of the process by tolerating flex in the performance of tasks. For example, and as disclosed with reference to FIG. 4, groups of tasks can be accomplished (e.g., by users/works using a coordinator interface) at a particular boundary state. When performing tasks within a boundary, the tasks can be re-oriented, performed in a variety of different manners, and generally can flex in the manner required to continue the organizational process. Once the tasks are completed and an inflection point/boundary state is achieved, the synchronization of contextualized data and shift to the next boundary state again enables flex in the next task/group of tasks. In other words, the state driven synchronization/boundary state shift built into the reflection database architecture inherently supports flex in the way the tasks are performed.

Embodiments of the reflection database architecture that include an embedded organizational process also improve data quality generated by the process and reduce the data expansion that accompanies the process. For example, the at least two databases that participate in the reflection architecture synchronize a limited portion of data to progress the organizational process, namely contextualized data that is designed to be necessary and sufficient for progression. Accordingly, unnecessary and/or inconsequential data can be held out from participating in the organizational process, and the usual data expansion that accompanies processes can be mitigated. Moreover, the detection of inflection points and/or boundaries, and the execution of synchronization can include data validation in some embodiments. This validation being built into the architecture itself ensures that the contextualized data (e.g., the data necessary and sufficient for progression) is of a standard quality.

Embodiments of the reflection database architecture that include an embedded organizational process also improve computational efficiency for the system by organizing a streamlined progression. In particular, the Process Abstraction Layer and contextualized mapped coordinated data fields defined therein reduce the data that participates in progressing the organizational process. In some embodiments, the reflection architecture includes a source database and a reflection database, where the reflection stores only the data tables and fields necessary for the tasks associated with the reflection database. For example, the reflection database may support tasks related to data entry, service support, logistics, scheduling, administration, and the like, and the data schema for the reflection database may only include tables and fields necessary to progress these tasks. Because the contextualized data is reduced in size and the schema for the reflection database is simplified in embodiments, the process of retrieving/querying data for the database, updating or adding data to the database, and/or supporting web applications (e.g., the coordinator interfaces) with the database are all simplified in their computational efficiency.

Embodiments of the reflection database architecture that include an embedded organizational process also improve database security. For example, as depicted in FIG. 7A, access to databases 7004 can be permitted to worker 7008 (e.g., via coordinator interface 702A) and access to database 7006 can be permitted to workers 7010 (e.g., via coordinator interface 704A). In some embodiments, the reflection architecture includes database 7004 as the source database and database 7006 as the reflection database, where database 7006 stores only the data tables and fields necessary for the tasks associated with the reflection database. For example, database 7004 may store sensitive information that is not duplicated in database 7006. Accordingly, the embedded organizational process can be progressed using workers 7010 without exposing the sensitive data in database 7004 to unnecessary access.

Consider an example organizational process relating to telemedicine, as disclosed with reference to FIG. 4. In this example, database 7004 can store certain types of patient data, tests results, or other sensitive data that has strictly mandated access restrictions. In some embodiments, database 7006 can be populated with data that is not under such strict access restrictions (e.g., less sensitive data) such that the telemedicine organizational process can be progressed by workers 7010 (e.g., users that cannot view the sensitive data) because these workers access database 7006 to perform relevant tasks (e.g., admin tasks, scheduling tasks, follow-up tasks, and the like). For example, if the health plan for a telemedicine patient includes a follow-up questionnaire after a telemedicine visit, database 7006 (and the contextualized data synced to database 7006 from database 7004) can include an indication if the patient has begun or completed this follow-up questionnaire without exposing the sensitive data in the questionnaire itself.

If database 7006 stores an indication that the questionnaire has not been completed, one of the tasks that workers 7010 may perform is to contact the patient to determine why the questionnaire has not been completed or to remind the patient that the questionnaire is outstanding. If database 7006 stores an indication that the questionnaire has been completed, workers 7010 may move to a next task that can be undertaken because the questionnaire is no longer outstanding.

In some embodiments, worker 7008 that has access to database 7004 and coordinator interface 702A can be associated with a credential (e.g., username) comprising a first degree of access while workers 7010 that have access to database 7006 and coordinator interface 702B can be associated with credentials (e.g., usernames) comprising a second degree of access, where the first degree of access permits access to database 7004 and the second degree of access permits access to database 7006. In these embodiments, the organizational process (e.g., telemedicine organizational process) can be progressed by users/workers who are not permitted to access patient sensitive data because embodiments of the reflection database architecture physically separate the sensitive data from the less sensitive data.

Embodiments that store sensitive data in database 7004 and less sensitive data in database 7006 realize several security improvements over the conventional implementation of database security, such as role based access or other logical security parameters. For example, because database 7006 does not store the sensitive data at all, the reflection database architecture is less susceptible to SQL injection attacks. If one of workers 7010 is a harmful actor, an SQL injection attack on database 7006 (e.g., using coordinator interface 704B) would not expose the sensitive data stored at database 7004. In addition, role based access restrictions are susceptible to admin issues that may improperly expose access to roles or users that are not permitted access. Again, because database 7006 does not store the sensitive data, the workers/users with the credential that permits the second degree of access cannot mistakenly be given access to the sensitive data. In general, because database 7006 does not store the sensitive data, and the number users/workers given access to database 7004 (e.g., given the credential comprising the first degree of access) is kept to a minimum, the reflection database architecture is able to support distributed applications and a diversity of workers (with varying degree of access rights) and yet maintain strong levels of security for sensitive data.

Described embodiments include legal and medical organizational processes, however any suitable organizational process can be implemented. For example, a Process Abstraction Layer can be defined for any suitable organizational process such that the process boundaries can be abstracted and realized within the reflection database architecture itself to propel the process forward.

Figure 11:
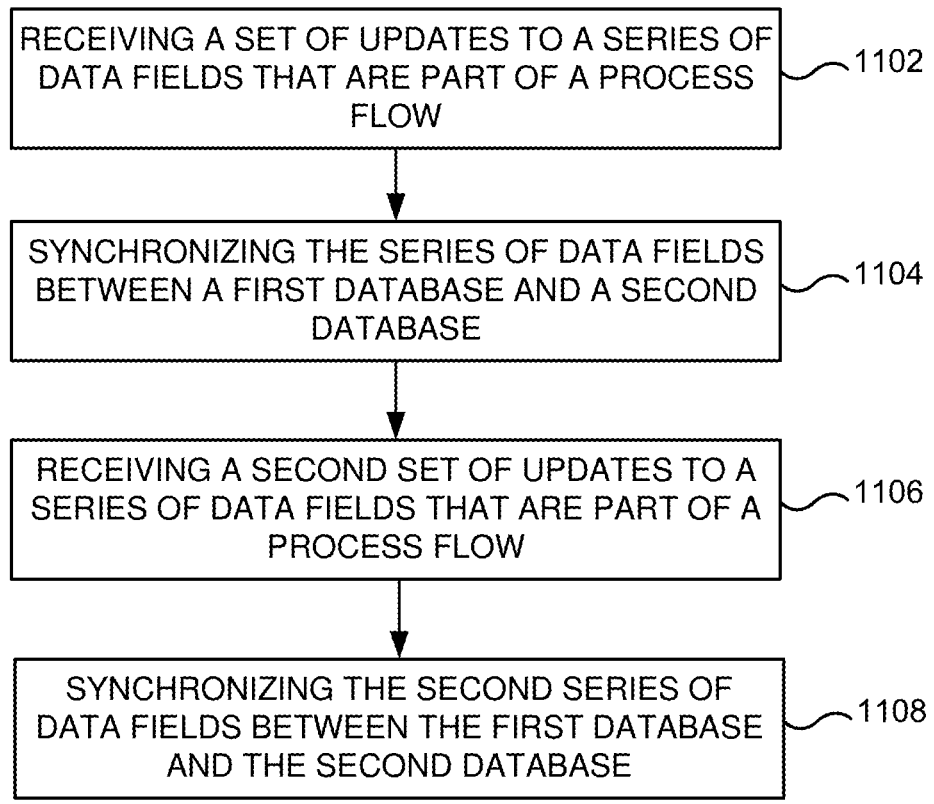
FIG. 11 illustrates another flow diagram for state driven bi-directional synchronization in a reflection database architecture according to an example embodiment.

FIG. 11 illustrates another flow diagram for state driven bi-directional synchronization in a reflection database architecture according to an example embodiment. At 1102, a set of changes to a series of data fields can be received at a first database, the set of changes being part of a first process flow. In some embodiments, the first database can be a reflection of a second database over a partition. In some embodiments, the first and second databases can be cloud databases implemented by a cloud architecture.

In some embodiments, a Process Abstraction Layer for the first process flow can map coordinated contextualized data fields from the first and second databases to a series of value-added and ordered tasks that comprise the first process flow, and the series of data fields can be mapped coordinated contextualized data fields for one or more of the value-added and ordered tasks. For example, the Process Abstraction Layer can be a conceptual model that maps the first data flow onto the reflection database architecture.

At 1104, state driven synchronization can be performed by a bi-directional synchronization engine for at least a portion of the series of data fields between the first database and the second database. The bi-directional synchronization engine can be configured to bi-directionally synchronize data between the first database and the second database based at least in part on detecting a boundary state at one or more of the first database and the second database. The state driven synchronization can be triggered when the bi-directional synchronization engine detects that the set of changes to the series of data fields achieves a boundary state for the first process flow, and until the bi-directional synchronization engine detects that the set of changes to the series of data fields achieves the boundary state for the first process flow, an asymmetry can be maintained between the first database and the second database for the portion of the series of data fields.

In some embodiments, the Process Abstraction Layer can map coordinated contextualized data fields from the first and second databases to one or more boundary states for the first process flow, and detection of one of the defined boundary states, by the bi-directional synchronization engine, can trigger a state driven synchronization between the first database and the second databases for the coordinated contextualized data fields mapped to the detected boundary state that triggered the synchronization. For example, performing state driven synchronization by the bi-directional synchronization engine of the series of data fields between the first database and the second database can include updating the second database with data values from the first database for the coordinated contextualized data fields mapped to the achieved boundary state for the first process flow in the Process Abstraction Layer.

In some embodiments, one or more tasks that comprise a first group of tasks can be assigned to the first database in the Process Abstraction Layer, and one or more tasks that comprise a second group of tasks can be assigned to the second database in the Process Abstraction Layer, the second group of tasks being after the first group of tasks in the series of value-added and ordered tasks. For example, the first group of tasks can be accomplished by creating, reading, updating, and/or deleting data from the first database and the second group of tasks can be accomplished by creating, reading, updating, and/or deleting data from the second database.

In some embodiments, the bi-directional synchronization engine can be a rules-based state detection engine that monitors data elements stored at the first database and the second database and monitors changes to these data elements, the changes comprising one of more of creating, updating, and deleting. For example, detecting that the set of changes to the series of data fields achieves the boundary state for the first process flow can include detecting, by the rule-based state detection engine, that the set of changes achieves a predefined boundary state criterion/criteria for the first process flow based on the state of the series of data fields after the changes, the predefined boundary state criterion/criteria being defined in the Process Abstraction Layer.

In some embodiments, the predefined boundary state criterion/criteria comprises non-null data values for one or more of the series of data fields, modified data values for one or more of the series of data fields, numeric data values for one or more of the series of data fields, alphanumeric data values for one or more of the series of data fields, and a minimum length for data values for one or more of the series of data fields. In some embodiments, the Process Abstraction Layer can define a sequence of predefined boundary states (and individual boundary state criterion/criteria corresponding to each predefined boundary state) that progress through the value-added and ordered tasks of the first process flow.

In some embodiments, one or more first users perform the first group of tasks using one or more first coordinator interfaces configured to access and change data stored at the first database, and the first coordinator interfaces are configured to selectively display data from the first database and receive the set of changes to the series of data fields. For example, the first coordinator interfaces can be web applications configured to receive the set of changes to the series of data fields for the first database and implement the set of changes at the first database using a cloud database connection. In some embodiments, the first workers can be remote workers.

At 1106, after the state driven synchronization of at least the portion of the series of data fields, a set of changes to a second series of data fields can be received at one or more second coordinator interfaces configured to access and change data stored at the second database, wherein one or more second users perform the second group of tasks using the second coordinator interfaces and the second series of data fields comprise coordinated contextualized data fields mapped to the second group of tasks in the Process Abstraction Layer. For example, the second coordinator interfaces can be configured to selectively display data from the second database based on the portion of the series of data fields synchronized, and the second coordinator interfaces can be configured to receive the set of changes to the second series of data fields after the state driven synchronization of at least the portion of the series of data fields.

At 1108, state driven synchronization can be performed by the bi-directional synchronization engine for at least a portion of the second series of data fields between the first database and the second database. For example, the state driven synchronization can be triggered when the bi-directional synchronization engine detects that the set of changes to the second series of data fields achieves a second boundary state for the first process flow defined in the Process Abstraction Layer. In some embodiments, performing state driven synchronization by the bi-directional synchronization engine of the second series of data fields between the first database and the second database includes updating the first database with data values from the second database for the coordinated contextualized data fields mapped to the achieved second boundary state for the first process flow.

In some embodiments, the first users comprise first credentials to access the first coordinator interfaces and the first database and the second users comprise second credentials to access the second coordinator interfaces and the second database. For example, the second database can store sensitive data comprising access restrictions that is not stored in the first database, and the partition between the first database and the second database can secure the sensitive data from the first users comprising the first credentials. For example, the sensitive data stored at the second database can be secured from an SQL injection attack at the first database based on the partition between the first database and the second database. In some embodiments, the credentials can include a username, password, and multi-factor authentication component.

Figure 12:
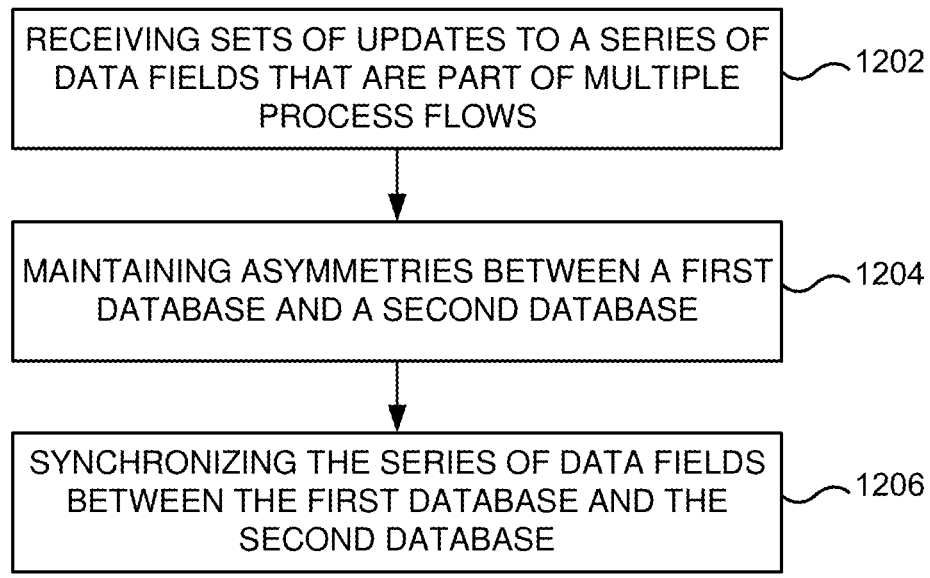
FIG. 12 illustrates a flow diagram for state driven bi-directional synchronization in a reflection database architecture for multiple instances of data over time according to an example embodiment.

FIG. 12 illustrates a flow diagram for state driven bi-directional synchronization in a reflection database architecture for multiple instances of data over time according to an example embodiment. At 1202, at a first database, multiple sets of changes to multiple series of data fields can be received, the multiple sets of changes being part of a plurality of separate process flows, wherein at a given point of time, a plurality of asymmetries are maintained between the first database and the second database based on sets of changes to series of data fields at the first database that correspond to different ones of the separate process flows that have not been synchronized. For example, each corresponding process flow can have a Process Abstraction Layer that maps the process flow onto the database reflection architecture and that defines an ordered set of tasks for the process flow, coordinated contextualized data fields for the tasks of the process flow, boundary points for the process flow, and coordinated contextualized data fields for the boundary points for the process flow. In some embodiments, a plurality of coordinator interfaces can be used by groups of remote workers to perform the tasks of the process flows, and create, read, update, and delete data from the first and second databases.

At 1204, asymmetries can be maintained between the first database and the second database. For example, until boundary points are met for a corresponding process flow, the series of changes to the data fields for that process flow are maintained in an asymmetric state across the first and second databases.

At 1206, at different points in time, state driven synchronization can be performed, by the bi-directional synchronization engine, of at least portions of the multiple series of data fields between the first database and second database to reflect the sets of changes. For example, the state driven synchronization of a given series of data fields can be triggered when the bi-directional synchronization engine detects that a given set of changes to the given series of data fields achieves a boundary state for a given process flow. In some embodiments, the boundary states and the coordinated contextualized data fields synchronized upon detection of the boundary states can be defined in the Process Abstraction Layer for each separate process flow.

Embodiments include a reflection database architecture that bi-directionally synchronizes data from two or more separate databases based on the state of the data contained in each database. For example, the reflection database architecture can include a source database and a reflection database. Over time, the state of data stored in each database can continuously change and state driven synchronization can be triggered for different portions of data at various points in time.

Embodiments of the reflection architecture achieve a database relationship where portions of data stored at each database are maintained in an asymmetric state until a synchronization is triggered. Because many different portions of data are continuously changing state at each database and synchronization is only triggered for portions of data at various points of time, at a given time the two databases can maintain a symmetric state for some portions of data and an asymmetric state for other portions of data. While a source and reflection database are used for descriptive purposes, the reflection database architecture can include two, three, four, or many more databases, and the databases can be configured as a source and many reflections, multiple sources and multiple reflections, databases with varying degrees of redundancy, or any other suitable configuration.

In some embodiments, the source database can store elements of data relevant to one or more organizational functions (e.g., accounting, business development, such as sales and marketing, audit, work assignments, human resources, and the like) or an entire organizational system, one or more applications (e.g., a web application, third-party application, and the like), one or more geographic locations, and any other suitable organizational schemes. Embodiments of the reflection database include a reflected copy of a portion of this data. For example, the reflection database can contain data for a particular organizational function (e.g., relevant to business development), data for a particular application (e.g., a particular third-party application) or set of applications, data for a specific geographic location, and the like. In some embodiments, the reflection database is a full copy of the source database.

As the source database serves its role (within a larger system), portions of the data stored in the source database can be read, edited, manipulated, and/or generally used to accomplish organizational tasks (e.g., accounting tasks, sales and marketing tasks, operational tasks, and the like). Within an organization, the way a data element is used can vary based on organizational process or can vary based on the state of a given organizational process (e.g., where in the organizational process the data element is being used). For example, a first organizational process may read a given data element, manipulate the data element at various points in time, and eventually overwrite the data element. A second organizational process may retrieve the data element and use one or more values in an analytical process or other batch process. However, the first and second organizational processes may have different temporal qualities such that the state of the given data element may be ripe for one of the processes but not for the other. In other words, the first and second organizational processes may interfere with one another when the given data element is forced to maintain a single state (e.g., in one database).

Embodiments of the reflection database architecture reflect the data element over a partition such that the given data element is maintained in two separate databases. The data element being maintained at two separate databases can achieve the requirements of both organizational processes, as the given data element need not maintain a single state. In some embodiments, the data element stored at the source database can be accessed and used in an analytical or batch process according to the second organizational process while the data element stored at the reflection database can be read, manipulated, and eventually overwritten according to the first organizational process.

In some embodiments, the temporal qualities between organizational processes may be based on dependencies among other data fields. For example, a first organizational process may access a number of data elements for display and/or analytical purposes, including a first data element. A second organizational process may overwrite the first data element, however the overwritten state of the first data element may not be ripe for the display or analytics of the first organizational process. For example, it may be required that the second organizational process achieve an outcome (e.g., inflection point and/or boundary state) by updating a set of data fields before the overwritten state of the first data element is ripe for the first organizational process. In other words, the display and/or analytics performed by the first organizational process would require use of the first data element in its original state (before being overwritten) until the completion of the second organizational process. Embodiments of the reflection architecture can maintain the first data element in different states and meet the data and temporal requirements of both organizational processes.

While two databases can maintain different states for the given data element at various points in time, often organizational demands require the data element to achieve a consistent state (even if temporarily). Embodiments perform state driven synchronization across the partition between the source database and target database for the given data element (e.g., when the organizational processes progress the data to a state that is ripe for the synchronization). In some embodiments, a bi-directional synchronization engine determines when a given organizational process (e.g., being performed using the reflection database) achieves a data state that is ripe for synchronization (e.g., with the source database) such that the data elements read, edited, and/or manipulated when performing the given organizational process can be synchronized. The synchronization engine can perform bi-directional synchronization such that data elements from the source database can be synchronized with the reflection database and data elements from the reflection database can be synchronized with the source database.

In some embodiments, a Process Abstraction Layer is implemented for a given organizational process that abstracts the given organizational process such that it can be realized in the database reflection architecture itself. For example, the Process Abstraction Layer can define inflection points and/or boundary states that, when detected by the bi-directional synchronization engine, trigger database synchronization. The Process Abstraction Layer can define contextualized data to be synchronized back and forth between the databases of the reflection architecture, and this contextualized data can be data that is necessary and sufficient to continue to progress the given organizational process to a desired outcome. In some embodiments, the Process Abstraction Layer and triggered synchronizations drive the given organizational process forward, utilizing the reflection database architecture and the process boundaries embedded in the architecture (by the Process Abstraction Layer) to propel the process.

Embodiments include multiple organizational processes (e.g., using both the source database and the reflection database) occurring at a given point in time, and thus the states of many organizational data elements can be in flux. Because these organizational processes result in many different data states, inflection points and/or boundary states are used to trigger synchronization of data elements across databases. Embodiments of the bi-directional synchronization engine determine when the data state achieved by performing the different organizational processes reach inflection points and/or boundary states such that the data elements read, edited, and/or manipulated can be synchronized. In other words, the bi-directional synchronization engine performs state driven synchronization of different data elements at different points in time, and this synchronization is triggered when the state of data elements relevant to a particular organizational process achieve an inflection point and/or boundary state.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for state driven bi-directional synchronization in a reflection database architecture, the method comprising:
receiving, at a first database, a set of changes to a series of data fields, the set of changes being part of a first process flow, wherein
the first database comprises a reflection of a second database over a partition,
a Process Abstraction Layer for the first process flow maps coordinated contextualized data fields from the first and second databases to a series of value-added and ordered tasks that comprise the first process flow, and
at least a portion of the series of data fields comprise mapped coordinated contextualized data fields for one or more of the value-added and ordered tasks; and
performing state driven synchronization by a bi-directional synchronization engine between the first database and the second database, wherein
the Process Abstraction Layer maps data fields from the first and second databases to one or more boundary states for the first process flow,
the state driven synchronization is triggered when the bi-directional synchronization engine detects that the set of changes to the series of data fields achieves a first boundary state of the one or more boundary states for the first process flow,
the state driven synchronization is performed for data fields mapped to the achieved first boundary state that triggered the synchronization, and
until the bi-directional synchronization engine detects that the set of changes to the series of data fields achieves the first boundary state, an asymmetry is maintained between the first database and the second database for at least the series of data fields that are mapped to the first boundary.

2. The method of claim 1, wherein one or more tasks that comprise a first group of tasks is assigned to the first database in the Process Abstraction Layer, and one or more tasks that comprise a second group of tasks is assigned to the second database in the Process Abstraction Layer, the second group of tasks being after the first group of tasks in the series of value-added and ordered tasks.

3. The method of claim 2, wherein performing state driven synchronization by the bi-directional synchronization engine between the first database and the second database comprises updating the second database with data values from the first database for at least a portion of the data fields mapped to the achieved first boundary state.

4. The method of claim 3, wherein the bi-directional synchronization engine comprises a rules-based state detection engine that monitors data elements stored at the first database and the second database and monitors changes to these data elements, the changes comprising one of more of creating, updating, and deleting.

5. The method of claim 4, wherein detecting that the set of changes to the series of data fields achieves the first boundary state for the first process flow further comprises detecting, by the rule-based state detection engine, that the set of changes achieves a predefined boundary state criterion for the first boundary state based on the state of at least a portion of the series of data fields after the changes, the predefined boundary state criterion being defined in the Process Abstraction Layer.

6. The method of claim 5, wherein the predefined boundary state criterion comprises one or more of non-null data values for one or more of the series of data fields, modified data values for one or more of the series of data fields, numeric data values for one or more of the series of data fields, alphanumeric data values for one or more of the series of data fields, and a minimum length for data values for one or more of the series of data fields.

7. The method of claim 4, wherein one or more first users perform the first group of tasks using one or more first coordinator interfaces configured to access and change data stored at the first database, and the first coordinator interfaces are configured to selectively display data from the first database and receive the set of changes to the series of data fields.

8. The method of claim 7, further comprising:
receiving, after the state driven synchronization is performed for the data fields mapped to the achieved first boundary state, a set of changes to a second series of data fields at one or more second coordinator interfaces configured to access and change data stored at the second database, wherein one or more second users perform the second group of tasks using the second coordinator interfaces and the second series of data fields comprise coordinated contextualized data fields mapped to the second group of tasks in the Process Abstraction Layer.

9. The method of claim 8, wherein the second coordinator interfaces are configured to selectively display data from the second database, and the second coordinator interfaces are configured to receive the set of changes to the second series of data fields after the state driven synchronization is performed for the data fields mapped to the achieved first boundary state.

10. The method of claim 9, further comprising:
performing another state driven synchronization by the bi-directional synchronization engine between the first database and the second database, wherein
the another state driven synchronization is triggered when the bi-directional synchronization engine detects that the set of changes to the second series of data fields achieves a second boundary state of the one or more boundary states for the first process flow,
the another state driven synchronization is performed for data fields mapped to the achieved second boundary state, and
performing the another state driven synchronization by the bi-directional synchronization engine of the second series of data fields between the first database and the second database comprises updating the first database with data values from the second database for at least a portion of the data fields mapped to the achieved second boundary state.

11. The method of claim 8, wherein the first coordinator interfaces comprise web applications configured to receive the set of changes to the series of data fields for the first database and implement the set of changes at the first database using a cloud database connection, and the first users comprise remote users.

12. The method of claim 11, wherein the first users comprise first credentials to access the first coordinator interfaces and the first database, the second users comprise second credentials to access the second coordinator interfaces and the second database, the second database stores sensitive data comprising access restrictions that is not stored in the first database, and the partition between the first database and the second database secures the sensitive data from the first users comprising the first credentials.

13. The method of claim 12, wherein the sensitive data stored at the second database is secured from an SQL injection attack at the first database based on the partition between the first database and the second database.

14. The method of claim 1, further comprising:
receiving, at the first database, multiple sets of changes to multiple series of data fields, the multiple sets of changes being part of a plurality of separate process flows, wherein at a given point of time, a plurality of asymmetries are maintained between the first database and the second database based on sets of changes to series of data fields at the first database that correspond to different ones of the separate process flows that have not been synchronized.

15. The method of claim 14, further comprising:
performing, at different points in time, state driven synchronization, by the bi-directional synchronization engine, of at least portions of the multiple series of data fields between the first database and second database to reflect the sets of changes, wherein state driven synchronization of a given series of data fields is triggered when the bi-directional synchronization engine detects that a given set of changes to one or more of the given series of data fields achieves a boundary state for a given process flow of the plurality of separate process flows.

16. A system for state driven bi-directional synchronization in a reflection database architecture, the system comprising:
a first database and second database, wherein
a set of changes to a series of data fields is received at the first database, the set of changes being part of a first process flow,
the first database comprises a reflection of the second database over a partition,
a Process Abstraction Layer for the first process flow maps coordinated contextualized data fields from the first and second databases to a series of value-added and ordered tasks that comprise the first process flow, and
at least a portion of the series of data fields comprise mapped coordinated contextualized data fields for one or more of the value-added and ordered tasks; and
a bi-directional synchronization engine, implemented by a process and memory, configured to bi-directionally synchronize data between the first database and the second database, wherein
the Process Abstraction Layer maps data fields from the first and second databases to one or more boundary states for the first process flow,
the state driven synchronization is triggered when the bi-directional synchronization engine detects that the set of changes to the series of data fields achieves a first boundary state of the one or more boundary states for the first process flow,
the state driven synchronization is performed for the data fields mapped to the detected first boundary state that triggered the synchronization, and
until the bi-directional synchronization engine detects that the set of changes to the series of data fields achieves the first boundary state for the first process flow, an asymmetry is maintained between the first database and the second database for at least the series of data fields that are mapped to the first boundary.

17. A non-transitory computer-readable medium having instructions stored thereon that, when executed by a processor, cause the processor to perform state driven bi-directional synchronization in a reflection database architecture, the instructions causing the processor to:
receive, at a first database, a set of changes to a series of data fields, the set of changes being part of a first process flow, wherein
the first database comprises a reflection of a second database over a partition, and
a Process Abstraction Layer for the first process flow maps coordinated contextualized data fields from the first and second databases to a series of value-added and ordered tasks that comprise the first process flow, and
at least a portion of the series of data fields comprise mapped coordinated contextualized data fields for one or more of the value-added and ordered tasks;
perform state driven synchronization by the bi-directional synchronization engine between the first database and the second database, wherein
the Process Abstraction Layer maps data fields from the first and second databases to one or more boundary states for the first process flow,
the state driven synchronization is triggered when the bi-directional synchronization engine detects that the set of changes to the series of data fields achieves a first boundary state of the one or more boundary states for the first process flow,
the state driven synchronization is performed for data fields mapped to the achieved first boundary state that triggered the synchronization, and
until the bi-directional synchronization engine detects that the set of changes to the series of data fields achieves the boundary state for the first process flow, an asymmetry is maintained between the first database and the second database for at least the series of data fields that are mapped to the first boundary.

* * * * *